United States Patent
Stojanovski

(10) Patent No.: US 12,200,663 B2
(45) Date of Patent: Jan. 14, 2025

(54) PAGING CAUSE DETERMINATION FOR INACTIVE DEVICE IN THE 5G SYSTEM

(71) Applicant: Intel Corporation, Santa Clara, CA (US)

(72) Inventor: Alexandre Saso Stojanovski, Paris (FR)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/474,805

(22) Filed: Sep. 26, 2023

(65) Prior Publication Data

US 2024/0040543 A1    Feb. 1, 2024

Related U.S. Application Data

(63) Continuation of application No. 17/033,623, filed on Sep. 25, 2020, now Pat. No. 11,832,214.

(60) Provisional application No. 62/906,484, filed on Sep. 26, 2019.

(51) Int. Cl.
*H04W 68/00*    (2009.01)
*H04W 8/08*    (2009.01)
*H04W 28/02*    (2009.01)
*H04W 48/16*    (2009.01)
*H04W 76/27*    (2018.01)

(52) U.S. Cl.
CPC .......... *H04W 68/005* (2013.01); *H04W 8/08* (2013.01); *H04W 28/0268* (2013.01); *H04W 48/16* (2013.01); *H04W 76/27* (2018.02)

(58) Field of Classification Search
CPC . H04W 68/005; H04W 8/08; H04W 28/0268; H04W 48/16; H04W 76/27
See application file for complete search history.

(56) References Cited

U.S. PATENT DOCUMENTS 11,564,086 B2   1/2023   Nair et al.
11,832,214 B2 *   11/2023   Stojanovski .......... H04W 76/27

OTHER PUBLICATIONS

Office Action mailed Feb. 17, 2023 for U.S. Appl. No. 17/033,623, 12 pages.

* cited by examiner

*Primary Examiner* — Diane D Mizrahi
(74) *Attorney, Agent, or Firm* — Schwabe, Williamson & Wyatt, P.C.

(57) ABSTRACT

The present disclosure describes techniques for utilizing paging cause values for paging user equipment (UE). The Paging Cause may be used for the UE in an CM_IDLE state or when the UE is in an RRC_INACTIVE state. A paging cause information element is included in a paging message, and includes a paging cause value. The paging cause value indicates a type of traffic that has initiated a paging operation. Other embodiments may be described and/or claimed.

19 Claims, 7 Drawing Sheets ered by reference in their entireties.

PAGING CAUSE DETERMINATION FOR INACTIVE DEVICE IN THE 5G SYSTEM

CROSS REFERENCE TO RELATED APPLICATIONS

The present application is a continuation of U.S. application Ser. No. 17/033,623 filed Sep. 25, 2020, which claims priority to U.S. Provisional App. No. 62/906,484 filed Sep. 26, 2019, the contents of each of which are hereby incorporated by reference in their entireties.

BACKGROUND

Reachability management is responsible for detecting whether a user equipment (UE) is reachable and providing UE location (e.g., access node) for the network to reach the UE. This is done by paging UE and UE location tracking. The UE location tracking includes both UE registration area tracking (e.g., UE registration area update) and UE reachability tracking (e.g., UE periodic registration area update). Such functionalities can be either located at the Fifth Generation Core network (5GC) in the case of CM-IDLE state or Next Generation Radio Access Network (NG-RAN) in the case of CM-CONNECTED state.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
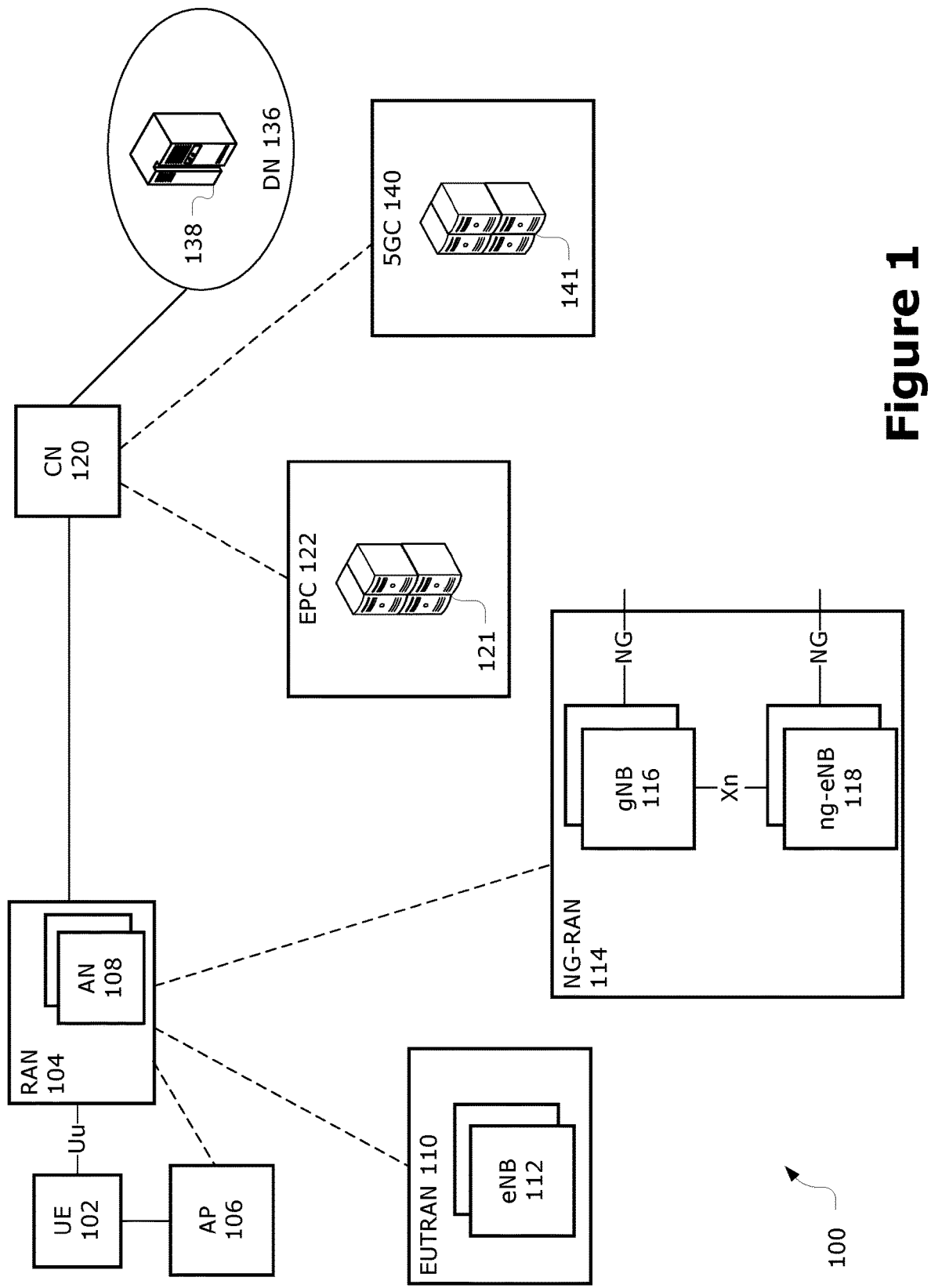
FIG. 1 illustrates an example network architecture according to various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

1. Introduction

Reachability management is responsible for detecting whether a UE (e.g., UE 102 of FIG. 1) is reachable and providing UE location (e.g., access node) for the network to reach the UE. This is done by paging UE and UE location tracking. The UE location tracking includes both UE registration area tracking (e.g., UE registration area update) and UE reachability tracking (e.g., UE periodic registration area update). Such functionalities can be either located at 5GC (in the case of CM-IDLE state) or NG-RAN (in the case of CM-CONNECTED state).

The UE and the AMF negotiate UE reachability characteristics for CM-IDLE state during Registration procedures. Two UE reachability categories are negotiated between UE and AMF for CM-IDLE state. One UE reachability category is UE reachability allowing Mobile Terminated data while the UE is CM-IDLE state. Here, the UE location is known by the network on a Tracking Area List granularity, paging procedures apply to this category, and mobile originating and mobile terminated data apply in this category for both CM-CONNECTED and CM-IDLE state. The UE second reachability category is Mobile Initiated Connection Only (MICO) mode, wherein mobile originated data applies in this category for both CM-CONNECTED and CM-IDLE state. Additionally, mobile terminated data is only supported when the UE is in CM-CONNECTED state.

Whenever a UE in RM-REGISTERED state enters CM-IDLE state, it starts a periodic registration timer according to the periodic registration timer value received from the AMF during a Registration procedure. The AMF allocates a periodic registration timer value to the UE based on local policies, subscription information and information provided by the UE. After the expiry of the periodic registration timer, the UE shall perform a periodic registration. If the UE moves out of network coverage when its periodic registration timer expires, the UE shall perform a Registration procedure when it next returns to the coverage.

The AMF runs a Mobile Reachable timer for the UE. The timer is started with a value longer than the UE's periodic registration timer whenever the CM state for the UE in RM-REGISTERED state changes to CM-IDLE. If the AMF receives an elapsed time from RAN when RAN initiate UE context release indicating UE unreachable, the AMF should deduce a Mobile Reachable timer value based on the elapsed time received from RAN and the normal Mobile Reachable timer value. The AMF stops the Mobile Reachable timer, if the UE CM state in the AMF moves to CM-CONNECTED state. If the Mobile Reachable timer expires, the AMF determines that the UE is not reachable.

However, the AMF does not know for how long the UE remains not reachable, thus the AMF shall not immediately de-register the UE. Instead, after the expiry of the Mobile Reachable timer, the AMF should clear the PPF and shall start an Implicit De-registration timer, with a relatively large value. The AMF shall stop the Implicit De-registration timer and set the PPF if the AMF moves the UE CM state in the AMF to CM-CONNECTED state. If the UE CM state in the AMF is CM-IDLE, then AMF considers the UE always unreachable if the UE is in MICO mode (refer to clause 5.4.1.3 of [1]).

If the Paging Proceed Flag (PPF) is not set, the AMF does not page the UE and shall reject any request for delivering DL signalling or data to this UE. If the Implicit Deregistration timer expires before the UE contacts the network, the AMF implicitly de-register the UE.

As part of deregistration for a particular access (3GPP or non-3GPP), the AMF shall request the UE's related SMF to release the PDU Sessions established on that access.

Based on operator configuration, the 5GS supports the AMF and NG-RAN to apply different paging strategies for different types of traffic. In the case of UE in CM-IDLE state, the AMF performs paging and determines the paging strategy based on, for example, local configuration, what NF triggered the paging and information available in the request that triggered the paging. If NWDAF is deployed, the AMF may also use analytics (e.g., statistics or predictions) on the UE's mobility as provided by NWDAF (see e.g., 3GPP TS 23.288).

In the case of UE in CM-CONNECTED with RRC Inactive state, the NG-RAN performs paging and determines the paging strategy based on e.g. local configuration, and information received from AMF as described in clause 5.4.6.3 and SMF as described in clause 5.4.3.2 of [1].

In the case of Network Triggered Service Request from SMF, the SMF determines the 5QI and ARP based on the downlink data or the notification of downlink data received from UPF. The SMF includes the 5QI and ARP corresponding to the received downlink PDU in the request sent to the AMF. If the UE is in CM IDLE, the AMF uses, for example, the 5QI and ARP to derive different paging strategies as described in 3GPP TS 23.502, clause 4.2.3.3. The 5QI is used by AMF to determine suitable paging strategies Paging policy differentiation (PPD) is an optional feature that allows an AMF (e.g., AMF 221 of FIG. 2), based on operator configuration, to apply different paging strategies for different traffic or service types provided within the same PDU Session. This feature usually only applies to PDU Session of the type "IP type."

When the 5GS supports the Paging Policy Differentiation (PPD) feature, the differentiated services code point (DSCP) value (e.g., Type of Service (TOS) in IPv4/TC in IPv6) is set by the application to indicate to the 5GS which Paging Policy should be applied for a certain IP packet. For example, as defined in 3GPP TS 23.228 v16.2.0 (2019-09-24), the P-CSCF may support Paging Policy Differentiation by marking packet(s) to be sent towards the UE that relate to a specific IP Multimedia Subsystem (IMS) services (e.g., conversational voice as defined in IMS multimedia telephony service) (see e.g., 3GPP TS 23.501 v16.2.0 (2019-09-24) (hereinafter "[1]"), clause 5.4.3.2).

In the case of Network Triggered Service Request and UPF buffering downlink data packet, the UPF shall include the DSCP in TOS (IPv4)/TC (IPv6) value from the IP header of the downlink data packet and an indication of the corresponding QoS Flow in the data notification message sent to the SMF. When PPD applies, the SMF determines the Paging Policy Indicator (PPI) based on the DSCP received from the UPF (see e.g., clause 5.4.3.2 of [1]).

In the case of Network Triggered Service Request and SMF buffering downlink data packet, when PPD applies, the SMF determines the PPI based on the DSCP in TOS (IPv4)/TC (IPv6) value from the IP header of the received downlink data packet and identifies the corresponding QoS Flow from the QFI of the received downlink data packet The SMF includes the PPI, the ARP and the 5QI of the corresponding QoS Flow in the N11 message sent to the AMF. If the UE is in CM IDLE, the AMF uses this information to derive a paging strategy, and sends paging messages to NG-RAN over N2 (see e.g., clause 5.4.3.2 of [1]).

For a UE in RRC Inactive state the NG-RAN may enforce specific paging policies in the case of NG-RAN paging, based on 5QI, ARP and PPI associated with an incoming DL PDU. To enable this, the SMF instructs the UPF to detect the DSCP in the TOS (IPv4)/TC (IPv6) value in the IP header of the DL PDU (by using a DL PDR with the DSCP for this traffic) and to transfer the corresponding PPI in the CN tunnel header (by using a FAR with the PPI value). The NG-RAN can then utilize the PPI received in the CN tunnel header of an incoming DL PDU in order to apply the corresponding paging policy for the case the UE needs to be paged when in RRC Inactive state (see e.g., clause 5.4.3.2 of [1]).

The 5GC network has all the necessary mechanisms in place to determine the Paging Policy Indicator (PPI) that points to a specific paging strategy: For a UE in CM_IDLE state the PPI indicator is used by the AMF when performing paging. For a UE in RRC_INACTIVE state the PPI is included in user plane frames on the N3/N9 interface. The header of the N3/N9 units is described in 3GPP TS 38.415 v15.2.0 (2019-01-08) (hereinafter "[2]"), section 5.5.2.1, as follows:

The DL PDU Session Information frame format (PDU Type 0) is defined to allow the NG-RAN to receive some control information elements which are associated with the transfer of a packet over the interface. Table 5.5.2.1-1 shows the respective DL PDU SESSION INFORMATION frame.

TABLE 5.5.2.1-1

| DL PDU SESSION INFORMATION (PDU Type 0) Format | | | | | | | | |
|---|---|---|---|---|---|---|---|---|
| Bits | | | | | | | | Number of |
| 7 | 6 | 5 | 4 | 3 | 2 | 1 | 0 | Octets |
| | PDU Type (=0) | | | | Spare | | | 1 |
| PPP | RQI | | | QoS Flow Identifier | | | | 1 |
| | PPI | | | Spare | | | | 0 or 1 |
| | | | Padding | | | | | 0-3 |

In the DL PDU SESSION INFORMATION frame of Table 5.5.2.1-1, the Paging Policy Presence (PPP) field indicates whether the PPI field is included or not. A Paging Cause may be introduced in the Uu Paging message. The Paging Cause may be determined by the MME and SMF (see e.g., 3GPP document S2-164764, "Paging cause introduction" (29 Aug.-2 Sep. 2016) (hereinafter "[3]") and 3GPP document S2-181868, "Paging cause to the UE" (26 Feb.-2 Mar. 2018) (hereinafter "[4]") for EPS and 5GS, respectively). In [3] and [4], the Paging Cause is determined by the MME and SMF (in EPS and 5GS, respectively) and is delivered to the UE in the Uu Paging message. The Paging Cause indicates the type of traffic that has caused the paging and can include, for example, one of the following values: "IMS voice", "IMS SMS", "IMS other", "other". The Paging Cause is supposed to assist the UE in deciding whether to respond to the page (e.g., when the Paging Cause is set to "IMS voice") or whether to defer the response (e.g., when the Paging Cause is set to "IMS SMS" and the UE is engaged in some high priority task).

The Paging Cause has not yet been agreed by 3GPP, but it may also have the potential to assist Dual-SIM dual standby devices. If the Paging Cause is agreed, for a UE in CM_IDLE state the Paging Cause may be determined by the SMF and may be sent to AMF over N11, then to NG-RAN via N2 Paging message and from there to the UE in Uu Paging message (see e.g., FIGS. 2 and 3). Conveyance of the Paging Cause to a UE in RRC_INACTIVE state has not been addressed. Various embodiments herein describe a mechanism for conveying a Paging Cause parameter in the Uu Paging message for UE in RRC_INACTIVE state.

Figure 2:
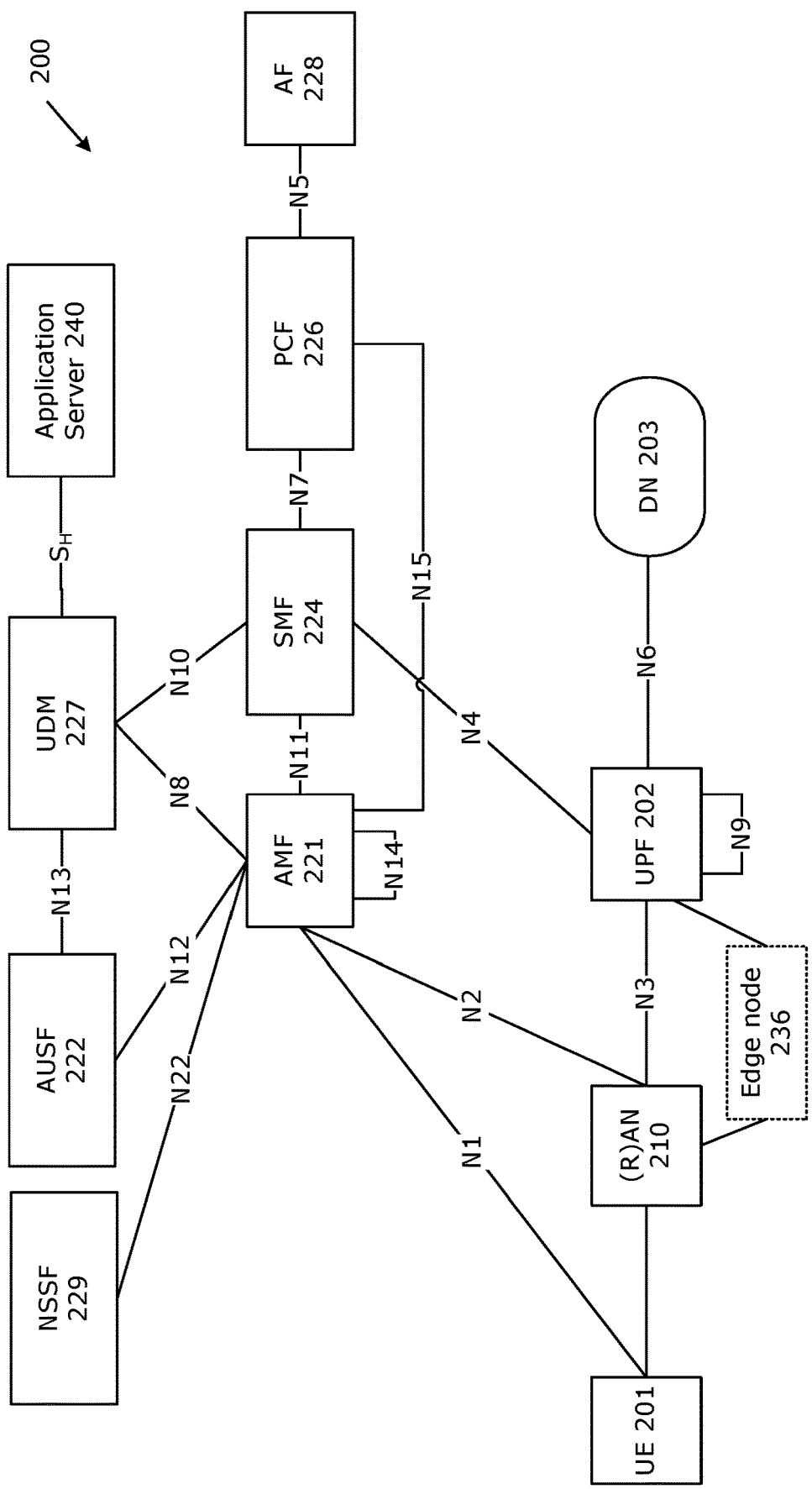
FIGS. 2 and 3 illustrate example system architectures of a core network, in accordance with various embodiments.

According to various embodiments, the SMF (e.g., SMF 224 of FIG. 2) determines the Paging Cause based on the differentiated service code point (DSCP) received from the UPF (e.g., UPF 202 of FIG. 2). According to various embodiments, for a UE in RRC_INACTIVE state, the SMF instructs the UPF to detect the DSCP in the TOS (IPv4)/TC (IPv6) value in the IP header of the DL PDU (by using a DL PDR with the DSCP for this traffic) and to transfer the corresponding Paging Cause in the CN tunnel header. The NG-RAN (e.g., (R)AN 210 of FIG. 2) can then utilize the Paging Cause received in the CN tunnel header of an incoming DL PDU in order to convey it to the UE in the [Uu] Paging message for the case the UE needs to be paged when in RRC_INACTIVE state.

2. Paging Policy Differentiation Embodiments

Paging policy differentiation is an optional feature that allows the AMF, based on operator configuration, to apply different paging strategies for different traffic or service types provided within the same PDU Session. In this Release of the specification this feature applies only to PDU Session of IP type.

When the 5GS supports the Paging Policy Differentiation (PPD) feature, the DSCP value (TOS in IPv4/TC in IPv6) is set by the application to indicate to the 5GS which Paging Policy should be applied for a certain IP packet. For example, as defined in 3GPP TS 23.228, the P-CSCF may support PPD by marking packet(s) to be sent towards the UE that relate to a specific IMS services (e.g., conversational voice as defined in IMS multimedia telephony service).

It is possible for the operator to configure the SMF in such a way that the Paging Policy Differentiation feature only applies to certain HPLMNs, DNNs and 5QIs. In the case of HR roaming, this configuration is done in the SMF in the VPLMN. Support of Paging Policy Differentiation in the case of HR roaming requires inter operator agreements including on the DSCP value associated with this feature.

In the case of Network Triggered Service Request and UPF buffering downlink data packet, the UPF shall include the DSCP in TOS (IPv4)/TC (IPv6) value from the IP header of the downlink data packet and an indication of the corresponding QoS Flow in the data notification message sent to the SMF. In various embodiments, when PPD applies, the SMF determines the Paging Policy Indicator (PPI) and optionally determines a Paging Cause based on the DSCP received from the UPF.

In various embodiments, in the case of Network Triggered Service Request and SMF buffering downlink data packet, when PPD applies, the SMF determines the PPI and optionally determines a Paging Cause based on the DSCP in TOS (IPv4)/TC (IPv6) value from the IP header of the received downlink data packet and identifies the corresponding QoS Flow from the QFI of the received downlink data packet.

The SMF includes the PPI, the ARP and the 5QI of the corresponding QoS Flow in the N11 message sent to the AMF. If the UE is in CM IDLE, the AMF uses this information to derive a paging strategy, and sends paging messages to NG-RAN over N2. In various embodiments, the AMF forwards the Paging Cause in the paging message to the NG-RAN if it was received from the SMF, The Paging Cause contains one of the following values: "IMS voice", "IMS SMS", "IMS other service" (e.g., not voice/SMS related) or "Other PS service" (e.g., not IMS related).

The network configuration needs to ensure that the information used as a trigger for Paging Policy Indication is not changed within the 5GS. Additionally, the network configuration needs to ensure that the specific DSCP in TOS (IPv4)/TC (IPv6) value, used as a trigger for Paging Policy Indication, is managed correctly in order to avoid the accidental use of certain paging policies.

For a UE in RRC Inactive state the NG-RAN may enforce specific paging policies in the case of NG-RAN paging, based on 5QI, ARP and PPI associated with an incoming DL PDU. To enable this, the SMF instructs the UPF to detect the DSCP in the TOS (IPv4)/TC (IPv6) value in the IP header of the DL PDU (by using a DL Packet Detection Rule (PDR) with the DSCP for this traffic) and to transfer the corresponding PPI and optionally the Paging Cause in the CN tunnel header (by using a Forwarding Action Rule (FAR) and/or a QoS Enforcement Rule (QER) with the PPI and Paging Cause value). The NG-RAN can then utilize the PPI received in the CN tunnel header of an incoming DL PDU in order to apply the corresponding paging policy for the case the UE needs to be paged when in RRC Inactive state. If the Paging Cause was include in the CN tunnel header of an incoming DL PDU the NG-RAN forwards the Paging Cause to the UE for the case the UE needs to be paged when in RRC Inactive state. In the case of Home-Routed roaming, the V-SMF is responsible of controlling UPF setting of the PPI. In the case of PDU Session with I-SMF, the I-SMF is responsible of controlling UPF setting of the PPI.

In various embodiments, the DL PDU Session Information frame format (PDU Type 0) may be updated or enhanced to include a Paging Cause field as shown by Table 5.5.2.1-1a or Table 5.5.2.1-1b.

TABLE 5.5.2.1-1a

DL PDU SESSION INFORMATION (PDU Type 0) Format

| Bits | | | | | | | | Number of |
|---|---|---|---|---|---|---|---|---|
| 7 | 6 | 5 | 4 | 3 | 2 | 1 | 0 | Octets |
| PDU Type (=0) | | | | Spare | | | | 1 |
| PPP | RQI | | | QoS Flow Identifier | | | | 1 |
| | PPI | | | Paging Cause | | Spare | | 0 or 1 |
| | | | | Padding | | | | 0-3 |

TABLE 5.5.2.1-1b

DL PDU SESSION INFORMATION (PDU Type 0) Format

| Bits | | | | | | | | Number of |
|---|---|---|---|---|---|---|---|---|
| 7 | 6 | 5 | 4 | 3 | 2 | 1 | 0 | Octets |
| PDU Type (=0) | | | | QMP | SNP | Spare | | 1 |
| PPP | RQI | | | QoS Flow Identifier | | | | 1 |
| | PPI | | | Paging Cause | | Spare | | 0 or 1 |
| | | | DL Sending Time Stamp | | | | | 0 or 8 |
| | | | DL QFI Sequence Number | | | | | 0 or 3 |
| | | | | Padding | | | | 0-3 |

The coding of information elements for the DL PDU SESSION INFORMATION frame of Table 5.5.2.1-1a are as follows.

The PDU Type indicates the structure of the PDU session UP frame. The field takes the value of the PDU Type it identifies. A value of "0" is for PDU Type 0. The PDU type is in bit 4 to bit 7 in the first octet of the frame and has a value range of {0=DL PDU SESSION INFORMATION, 1=UL PDU SESSION INFORMATION, 2-15=reserved for future PDU type e5ensions}. The PDY type has a field length of 4 bits.

The spare field is set to "0" by the sender and should not be interpreted by the receiver. This field is reserved for later versions. The spare field has a value range of (0-2n-1), and has a feld Length of n bits.

When present, the QoS Flow Identifier (QFI) parameter indicates the QFI of the QoS flow to which the transferred packet belongs. The QoS Flow Identifier (QFI) fiel has a value range of {0 . . . 26-1}, and a field length of 6 bits.

Reflective QoS Indicator (RQI) parameter indicates activation of the reflective QoS towards the UE for the transferred packet as described in clause 5.4.1.1 of [2]. It is used only in the downlink direction. If Reflective QoS Activation (RQA) has not been configured for the involved QoS flow, the RQI shall be ignored by the NG-RAN node.

The RQI field has a value range of {0=Reflective QoS activation not triggered, 1=Reflective QoS activation triggered}, and a field length of 1 bit.

The padding is included at the end of the frame to ensure that the PDU Session user plane protocol PDU length (including padding and the future e5ension) is (n*4-2) octets, where n is a positive integer. If there is any future e5ension, the padding should be added after the future e5ensions. The padding field has a field Length of 0-3 octets.

The Paging Policy Presence (PPP) parameter indicates the presence of the Paging Policy Indicator (PPI). The PPP field has a value range of {0=Paging Policy Indicator not present, 1=Paging Policy Indicator present}, and a field length of 1 bit.

When present, the Paging Policy Indicator (PPI) is used for paging policy differentiation (see details in [1]). This field applies to PDU sessions of IP type. The PPI field has a value range of $\{0 \ldots 2^3-1\}$, and field length of 3 bits.

The coding of information elements for the DL PDU SESSION INFORMATION frame of Table 5.5.2.1-1b include the coding of Table 5.5.2.1-1a and the following parameters.

The QoS Monitoring Packet (QMP) parameter indicates that the transferred packet is used for QoS monitoring as described in clauses 5.4.1.1 and 5.4.2.1 of [5]. This parameter also indicates the presence of the DL Sending Time Stamp in the DL PDU Session Information frame and the presence of the DL Sending Time Stamp Repeated, the DL Receiving Time Stamp, the UL Sending Time Stamp in the UL PDU Session Information frame. If QoS monitoring has not been configured for the involved QoS flow, the QMP shall be ignored by the NG-RAN node. This field has a length of 1 bit and includes a value range of {0=not used for QoS monitoring, 1=used for QoS monitoring}.

The DL Sending Time Stamp field indicates the time when the UPF sends the DL PDU Session Information frame with the QMP field set to 1. It is used only in the downlink direction and encoded in the same format as the 64-bit timestamp format as defined in Section 6 of IETF RFC 5905. The value range of this field is $\{0 \ldots 2^4-1\}$. And has a length of 8 octets.

The DL Sending Time Stamp Repeated field indicates the value of the DL Sending Time Stamp field that the NG-RAN has received in the DL PDU Session Information frame with the QMP field set to 1 for the involved QoS flow. It is used only in the uplink direction and encoded in the same format as the 64-bit timestamp format as defined in Section 6 of IETF RFC 5905. The UPF shall, if supported, use this information to calculate DL or RTT delay between the NG-RAN and the UPF as specified in [1].

The Sequence Number Presence (SNP) parameter indicates the presence of the DL QFI Sequence Number in the DL PDU Session Information frame or the presence of the UL QFI Sequence Number in the UL PDU Session Information frame. This field is 1 bit in length and has a value range of {0=DL/UL QFI Sequence Number not present, 1=DL/UL QFI Sequence Number present}.

The DL QFI Sequence Number parameter indicates the sequence number as assigned by the UPF/NG-RAN node associated with a given QoS Flow. This field has a length of 3 octets and a value range of $\{0 \ldots 2^{24}-1\}$.

The Paging Cause parameter indicates the type of traffic that has caused the paging. In various embodiments, the paging cause can include one of the following items "IMS voice", "IMS SMS", "IMS other", "other". In embodiments, the Paging Cause field may include a value that corresponds to one of the aforementioned items. For example, a value of "0" may correspond to the item "IMS voice", a value of "1" may correspond to the item "IMS SMS", a value of "2" or binary "010" may correspond to the item "IMS other", and a value of "3" or binary "011" may correspond to the item "other".

According to various embodiments, when the UE needs to be reached for Mobile Terminated (MT) control plane service, such as MT SMS, the AMF determines the Paging Cause and includes it in the [NG-AP] DOWNLINK NAS TRANSPORT message. The NG-RAN can then utilize the Paging Cause received in the [NG-AP] DOWNLINK NAS TRANSPORT message in order to convey it to the UE in the [Uu] Paging message for the case the UE needs to be paged when in RRC_INACTIVE state.

In these embodiments, the [NG-AP] DOWNLINK NAS TRANSPORT message defined in 3GPP TS 38.413 v15.4.0 (2019-07-18) (hereinafter "[5]") may be amended to include paging cause aspects. [5] defines the DL NAS transport message that is sent by the AMF (e.g., AMF 221 of FIG. 2) to the NG-RAN (e.g., NG-RAN 210 of FIG. 2) and is used for carrying NAS information over the NG interface (Direction: AMF→NG-RAN node). The DL NAS transport message information elements (Ies) are shown by Table 9.2.5.2.

TABLE 9.2.5.2

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| AMF UE NGAP ID | M | | 9.3.3.1 | | YES | reject |
| RAN UE NGAP ID | M | | 9.3.3.2 | | YES | reject |
| Old AMF | O | | AMF Name 9.3.3.21 | | YES | reject |
| RAN Paging Priority | O | | 9.3.3.15 | | YES | ignore |
| Paging Cause | O | | 9.3.3.x | | YES | ignore |

TABLE 9.2.5.2-continued

DOWNLINK NAS TRANSPORT

| IE/Group Name | Presence | Range | IE type and reference | Semantics description | Criticality | Assigned Criticality |
|---|---|---|---|---|---|---|
| NAS-PDU | M | | 9.3.3.4 | | YES | reject |
| Mobility Restriction List | O | | 9.3.1.85 | | YES | ignore |
| Index to RAT/Frequency Selection Priority | O | | 9.3.1.61 | | YES | ignore |
| UE Aggregate Maximum Bit Rate | O | | 9.3.1.58 | | YES | ignore |
| Allowed NSSAI | O | | 9.3.1.31 | Indicates the S-NSSAIs permitted by the network. | YES | reject |
| SRVCC Operation Possible | O | | 9.3.1.128 | | YES | ignore |
| Enhanced Coverage Restriction | O | | 9.3.1.140 | | YES | ignore |
| E5ended Connected Time | O | | 9.3.3.31 | | YES | ignore |
| UE Differentiation Information | O | | 9.3.1.144 | | YES | ignore |
| CE-mode-B Restricted | O | | 9.3.1.155 | | YES | ignore |
| UE Radio Capability | O | | 9.3.1.74 | | YES | ignore |
| UE Capability Info Request | O | | 9.3.1.192 | | YES | ignore |
| End Indication | O | | 9.3.3.32 | | YES | ignore |
| UE Radio Capability ID | O | | 9.3.1.142 | | YES | reject |

Table 9.2.5.2 provides the NGAP message and IE definitions for DL NAS transport messages in tabular format. The "IE type and reference" column in Table 9.2.5.2 refers to sections in [5]. The corresponding ASN.1 definition is presented in subclause 9.4 of [5]. In the Presence column of Table 9.2.5.2, "M" refers Mandatory IEs and "O" refers to Optional IEs. Mandatory IEs must always be included in the message and Optional IEs may or may not be included in the message. Each IE may have criticality information applied to it. In this case, all IEs have a criticality of "YES", which indicates that criticality information is applied and is usually usable only for non-repeatable IEs.

The Assigned Criticality column provides the actual criticality information. In the NGAP message, there is criticality information set for individual IEs and/or IE groups. This criticality information instructs the receiver how to act when receiving an IE or an IE group that is not comprehended. The receiving node shall take different actions depending on the value of the Criticality Information. The three possible values of the Criticality Information for an IE/IE group are: Reject IE, Ignore IE and Notify Sender, and Ignore IE. If the message is received with a Procedure Code IE marked with "Reject IE" which the receiving node does not comprehend, the receiving node shall reject the procedure using the Error Indication procedure. If a message is received with a Procedure Code IE marked with "Ignore IE" which the receiving node does not comprehend, the receiving node shall ignore the procedure. Other procedures are discussed in [5].

3. Example Systems and Device Configurations and Arrangements

Referring now to FIG. 1, which illustrates a network 100 in accordance with various embodiments. The network 100 may operate in a manner consistent with 3GPP technical specifications for Long Term Evolution (LTE) or 5G/NR systems. However, the example embodiments are not limited in this regard and the described embodiments may apply to other networks that benefit from the principles described herein, such as future 3GPP systems, or the like.

The network 100 includes a UE 102, which is any mobile or non-mobile computing device designed to communicate with a RAN 104 via an over-the-air connection. The UE 102 is communicatively coupled with the RAN 104 by a Uu interface, which may be applicable to both LTE and NR systems. Examples of the UE 102 include, but are not limited to, a smartphone, tablet computer, wearable computer, desktop computer, laptop computer, in-vehicle infotainment system, in-car entertainment system, instrument cluster, head-up display (HUD) device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, machine-to-machine (M2M), device-to-device (D2D), machine-type communication (MTC) device, Internet of Things (IoT) device, and/or the like. The network 100 may include a plurality of UEs 102 coupled directly with one another via a D2D, ProSe, PC5, and/or sidelink (SL) interface. These UEs 102 may be M2M/D2D/MTC/IoT devices and/or vehicular systems that communicate using physical SL channels such as, but not limited to, Physical Sidelink Broadcast Channel (PSBCH), Physical Sidelink Discovery Channel (PSDCH), Physical Sidelink Shared Channel (PSSCH), Physical Sidelink Control Channel (PSCCH), Physical Sidelink Feedback Channel (PSFCH), etc.

In some embodiments, the UE 102 may additionally communicate with an AP 106 via an over-the-air (OTA) connection. The AP 106 manages a WLAN connection, which may serve to offload some/all network traffic from the RAN 104. The connection between the UE 102 and the AP 106 may be consistent with any IEEE 802.11 protocol. Additionally, the UE 102, RAN 104, and AP 106 may utilize cellular-WLAN aggregation/integration (e.g., LWA/LWIP). Cellular-WLAN aggregation may involve the UE 102 being configured by the RAN 104 to utilize both cellular radio resources and WLAN resources.

The RAN 104 includes one or more access network nodes (ANs) 108. The ANs 108 terminate air-interface(s) for the UE 102 by providing access stratum protocols including Radio Resource Control (RRC), Packet Data Convergence Protocol (PDCP), Radio Link Control (RLC), Medium Access Control (MAC), and physical (PHY/L1) layer protocols. In this manner, the AN 108 enables data/voice connectivity between CN 120 and the UE 102. The ANs 108 may be a macrocell base station or a low power base station for providing femtocells, picocells or other like cells having smaller coverage areas, smaller user capacity, or higher bandwidth compared to macrocells; or some combination thereof. In these implementations, an AN 108 be referred to as a BS, gNB, RAN node, eNB, ng-eNB, NodeB, RSU, TRxP, etc.

One example implementation is a "CU/DU split" architecture where the ANs 108 are embodied as a gNB-Central Unit (CU) that is communicatively coupled with one or more gNB-Distributed Units (DUs), where each DU may be communicatively coupled with one or more Radio Units (RUs) (also referred to as RRHs, RRUs, or the like) (see e.g., 3GPP TS 38.401 v15.7.0 (2020-01-09)). In some implementations, the one or more RUs may be individual RSUs. In some implementations, the CU/DU split may include an ng-eNB-CU and one or more ng-eNB-DUs instead of, or in addition to, the gNB-CU and gNB-DUs, respectively. The ANs 108 employed as the CU may be implemented in a discrete device or as one or more software entities running on server computers as part of, for example, a virtual network including a virtual Base Band Unit (BBU) or BBU pool, cloud RAN (CRAN), Radio Equipment Controller (REC), Radio Cloud Center (RCC), centralized RAN (C-RAN), virtualized RAN (vRAN), and/or the like (although these terms may refer to different implementation concepts). Any other type of architectures, arrangements, and/or configurations can be used.

The plurality of ANs may be coupled with one another via an X2 interface (if the RAN 104 is an LTE RAN or Evolved Universal Terrestrial Radio Access Network (E-UTRAN) 110) or an Xn interface (if the RAN 104 is a NG-RAN 114). The X2/Xn interfaces, which may be separated into control/user plane interfaces in some embodiments, may allow the ANs to communicate information related to handovers, data/context transfers, mobility, load management, interference coordination, etc.

The ANs of the RAN 104 may each manage one or more cells, cell groups, component carriers, etc. to provide the UE 102 with an air interface for network access. The UE 102 may be simultaneously connected with a plurality of cells provided by the same or different ANs 108 of the RAN 104. For example, the UE 102 and RAN 104 may use carrier aggregation (CA) to allow the UE 102 to connect with a plurality of component carriers, each corresponding to a PCell or SCell. A PCell is an MCG cell, operating on a primary frequency, in which the UE 102 performs an initial connection establishment procedure and/or initiates a connection re-establishment procedure. An SCell is a cell providing additional radio resources on top of a Special Cell (SpCell) when the UE 102 is configured with CA. In CA, two or more Component Carriers (CCs) are aggregated. The UE 102 may simultaneously receive or transmit on one or multiple CCs depending on its capabilities. A UE 102 with single timing advance capability for CA can simultaneously receive and/or transmit on multiple CCs corresponding to multiple serving cells sharing the same timing advance (multiple serving cells grouped in one timing advance group (TAG)). A UE 102 with multiple timing advance capability for CA can simultaneously receive and/or transmit on multiple CCs corresponding to multiple serving cells with different timing advances (multiple serving cells grouped in multiple TAGs). The NG-RAN 114 ensures that each TAG contains at least one serving cell; A non-CA capable UE 102 can receive on a single CC and transmit on a single CC corresponding to one serving cell only (one serving cell in one TAG). CA is supported for both contiguous and non-contiguous CCs. When CA is deployed frame timing and SFN are aligned across cells that can be aggregated, or an offset in multiples of slots between the PCell/PSCell and an SCell is configured to the UE 102. In some implementations, the maximum number of configured CCs for a UE 102 is 16 for DL and 16 for UL.

In Dual Connectivity (DC) scenarios, a first AN 108 may be a master node that provides a Master Cell Group (MCG) and a second AN 108 may be secondary node that provides an Secondary Cell Group (SCG). The first and second ANs 108 may be any combination of eNB, gNB, ng-eNB, etc. The MCG is a subset of serving cells comprising the PCell and zero or more SCells. The SCG is a subset of serving cells comprising the PSCell and zero or more SCells. As alluded to previously, DC operation involves the use of PSCells and SpCells. A PSCell is an SCG cell in which the UE 102 performs random access (RA) when performing a reconfiguration with Sync procedure, and an SpCell for DC operation is a PCell of the MCG or the PSCell of the SCG; otherwise the term SpCell refers to the PCell. Additionally, the PCell, PSCells, SpCells, and the SCells can operate in the same frequency range (e.g., FR1 or FR2), or the PCell, PSCells, SpCells, and the SCells can operate in different frequency ranges. In one example, the PCell may operate in a sub-6 GHz frequency range/band and the SCell can operate at frequencies above 24.25 GHz (e.g., FR2).

The RAN 104 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In some embodiments, the RAN 104 may be an E-UTRAN 110 with one or more eNBs 112. The E-UTRAN 110 provides an LTE air interface (Uu) with the following characteristics: subcarrier spacing (SCS) of 15 kHz; cyclic prefix (CP)-OFDM waveform for DL and SC-FDMA waveform for UL; turbo codes for data and TBCC for control; etc. The LTE air interface may rely on channel state information reference signals (CSI-RS) for channel state information (CSI) acquisition and beam management; Physical Downlink Shared Channel (PDSCH)/Physical Downlink Control Channel (PDCCH) Demodulation Reference Signal (DMRS) for PDSCH/PDCCH demodulation; and cell-specific reference signals (CRS) for cell search and initial acquisition, channel quality measurements, and channel estimation for coherent demodulation/detection at the UE. The LTE air interface may operating on sub-6 GHz bands.

In some embodiments, the RAN 104 may be an next generation (NG)-RAN 114 with one or more gNB 116 and/or on or more ng-eNB 118. The gNB 116 connects with 5G-enabled UEs 102 using a 5G NR interface. The gNB 116 connects with a 5GC 140 through an NG interface, which includes an N2 interface or an N3 interface. The ng-eNB 118 also connects with the 5GC 140 through an NG interface, but may connect with a UE 102 via the Uu interface. The gNB 116 and the ng-eNB 118 may connect with each other over an Xn interface.

In some embodiments, the NG interface may be split into two parts, an NG user plane (NG-U) interface, which carries traffic data between the nodes of the NG-RAN 114 and a UPF (e.g., N3 interface), and an NG control plane (NG-C) interface, which is a signaling interface between the nodes of the NG-RAN 114 and an AMF (e.g., N2 interface).

The NG-RAN 114 may provide a 5G-NR air interface (which may also be referred to as a Uu interface) with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use Physical Broadcast Channel (PBCH) DMRS for PBCH demodulation; Phase Tracking Reference Signals (PTRS) for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an Synchronization Signal Block (SSB) that is an area of a DL resource grid that includes Primary Synchronization Signal (PSS)/Secondary Synchronization Signal (SSS)/PBCH.

The UE 102 can be configured to communicate using OFDM communication signals with other UEs 102 or with any of the AN 108 over a multicarrier communication channel in accordance with various communication techniques, such as, but not limited to, an OFDMA communication technique (e.g., for DL communications) or a SC-FDMA communication technique (e.g., for UL and SL communications), although the scope of the embodiments is not limited in this respect. The OFDM signals comprise a plurality of orthogonal subcarriers.

DL, UL, and SL transmissions are organized into frames with $T_f=(\Delta f_{max} N_f/100) \cdot T_c=10$ ms duration, each including ten subframes of $T_{sf}=(\Delta f_{max} N_f/1000) \cdot T_c=1$ ms duration. The number of consecutive OFDM symbols per subframe is $N_{symb}^{subframe,\mu}=N_{symb}^{slot} N_{slot}^{subframe,\mu}$, where $N_{symb}^{subframe,\mu}$ is the number of OFDM symbols per subframe for subcarrier spacing configuration µ (see e.g., clause 4.3.1 in 3GPP TS 38.211 v15.6.0 (2019 Jun. 24) (hereinafter "[TS38211]"), $N_{symb}^{slot}$ is the number of symbols per slot, and $N_{slot}^{subframe,\mu}$ is the number of slots per subframe for subcarrier spacing configuration µ (see e.g., clause 4.3.2 in [TS38211]). Each frame is divided into two equally-sized half-frames of five subframes each with half-frame 0 consisting of subframes 0-4 and half-frame 1 consisting of subframes 5-9. There is one set of frames in the uplink and one set of frames in the downlink on a carrier. Uplink frame number i for transmission from the UE shall start $T_{TA}=(N_{TA}+N_{TA,offset})T_c$ before the start of the corresponding downlink frame at the UE where $N_{TA,offset}$ given by 3GPP TS 38.213 v15.6.0 (2019 Jun. 24) (hereinafter "[TS38213]"), except for msgA transmission on the Physical Uplink Control Channel (PUSCH) where $N_{TA}=0$ is used.

There is one resource grid (also referred to as a time-frequency grid or the like) for a given antenna port p, subcarrier spacing (SCS) configuration µ, and transmission direction (e.g., DL, UL, or SL). For each numerology and carrier, a resource grid of $N_{grid,x}^{size,\mu} N_{sc}^{RB}$ subcarriers and $N_{symb}^{subframe,\mu}$ OFDM symbols is defined, starting at common resource block (RB) $NB_{grid}^{start,\mu}$ indicated by higher-layer signalling. An RB is defined as $N_{sc}^{RB}=12$ consecutive subcarriers in the frequency domain.

Each element in the resource grid for antenna port p and SCS configuration µ is called a resource element (RE) and is uniquely identified by $(k, l)_{p,\mu}$ where k is the index in the frequency domain and l refers to the symbol position in the time domain relative to some reference point. RE $(k, l)_{p,\mu}$ corresponds to a physical resource and the complex value $a_{k,l}^{(p,\mu)}$. When no particular antenna port or SCS is specified, the indices p and µ may be dropped, resulting in $a_{k,l}^{(p)}$ or $a_{k,l}$. Each resource grid comprises a number of RBs, which describe the mapping of certain physical channels to REs. Additionally, each RB comprises a collection of REs. An RE represents the smallest time-frequency unit in a resource grid.

Physical resource blocks (PRBs) for SCS configuration µ are defined within a bandwidth part (BWP) and numbered from 0 to $N_{BWP,i}^{size,\mu}-1$ where i is the number of the BWP. The relation between the physical resource block $n_{PRB}^{\mu}$ in BWP i and the common resource block $n_{CRB}^{\mu}$ is given by $n_{CRB}^{\mu}=n_{PRB}^{\mu}+N_{BWP,i}^{start,\mu}$ where $N_{BWP,i}^{start,\mu}$ is the common resource block where BWP i starts relative to common resource block 0. Virtual resource blocks (VRBs) are defined within a BWP and numbered from 0 to $N_{BWP,i}^{size}-1$ where i is the number of the BWP.

An antenna port is defined such that a channel over which a symbol on the antenna port is conveyed can be inferred from the channel over which another symbol on the same antenna port is conveyed. For DMRS associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same PRG (see e.g., clause 5.1.2.3 of 3GPP TS 38.214 v15.6.0 (2019 Jun. 24) (hereinafter "[TS38214]"). For DMRS associated with a PDCCH, the channel over which a PDCCH symbol on one antenna port is conveyed can be inferred from the channel over which a DMRS symbol on the same antenna port is conveyed only if the two symbols are within resources for which the UE may assume the same precoding being used (see e.g., clause 7.3.2.2 of [TS38211]). For DM-RS associated with a PBCH, the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index (see e.g., clause 7.4.3.1 of [TS38211]). Two antenna ports are said to be quasi co-located (QCL'd) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The DL transmission scheme includes, inter alia, a closed loop DMRS based spatial multiplexing is supported for PDSCH. In some implementations, up to 8 and 12 orthogonal DL DMRS ports are supported for type 1 and type 2 DMRS respectively. In some implementations, up to 8 orthogonal DL DMRS ports per UE 102 are supported for single user (SU)-multiple input multiple output (MIMO) and up to 4 orthogonal DL DMRS ports per UE are supported for multi-user (MU)-MIMO. The number of SU-MIMO code words is one for 1-4 layer transmissions and two for 5-8 layer transmissions. The DMRS and corresponding PDSCH are transmitted using the same precoding matrix and the UE 102 does not need to know the precoding matrix to demodulate the transmission. The transmitter may use different precoder matrix for different parts of the transmission bandwidth, resulting in frequency selective precoding. The UE 102 may also assume that the same precoding matrix is used across a set of PRBs, which is denoted as a Precoding Resource Block Group (PRG). Transmission durations from 2 to 14 symbols in a slot is supported, and aggregation of multiple slots with Transport Block (TB) repetition is supported.

Data and control streams from/to the MAC layer are encoded/decoded to offer transport and control services over the radio transmission link. A channel coding scheme is a combination of error detection, error correcting, rate matching, interleaving and transport channel or control information mapping onto/splitting from physical channels.

The PHY layer processing for the PDSCH and/or PHY layer processing of transport channels includes the following steps: transport block CRC attachment; code block segmentation and code block CRC attachment; channel coding (e.g., LDPC coding); PHY layer HARQ processing; rate matching; scrambling; modulation (e.g., QPSK, 16QAM, 64QAM and 256QAM); layer mapping; and mapping to assigned resources and antenna ports. The UE 102 may assume that at least one symbol with demodulation reference signal is present on each layer in which PDSCH is transmitted to the UE 102, and up to 3 additional DMRS can be configured by higher layers. Rate matching means that bits on a transport channel (TrCH) are repeated or punctured. Higher layers assign a rate-matching attribute for each TrCH. This attribute is semi-static and can only be changed through higher layer signalling. The rate-matching attribute is used when the number of bits to be repeated or punctured is calculated. Various aspects of rate matching are discussed in 3GPP TS 25.213 v15.0.0 (2017 Sep. 25) and 3GPP TS 38.212 v15.6.0 (2019 Jun. 24).

Additionally, the PDCCH can be used to schedule DL transmissions on PDSCH and UL transmissions on PUSCH, where the Downlink Control Information (DCI) on PDCCH includes: DL assignments containing at least modulation and coding format, resource allocation, and HARQ information related to DL shared channel (DL-SCH), and UL scheduling grants containing at least modulation and coding format, resource allocation, and HARQ information related to UL shared channel (UL-SCH). The UE 102 monitors a set of PDCCH candidates in configured monitoring occasions in one or more configured Control Resource Sets (CORESETs) according to corresponding search space configurations. A CORESET includes a set of PRBs with a time duration of 1 to 3 OFDM symbols. The resource units Resource Element Groups (REGs) and Control Channel Elements (CCEs) are defined within a CORESET with each CCE comprising a set of REGs. Control channels are formed by aggregation of CCE(s). Different code rates for the control channels are realized by aggregating different number of CCEs. Interleaved and non-interleaved CCE-to-REG mapping are supported in a CORESET. Polar coding and QPSK modulation is used for PDCCH. Each REG carrying PDCCH carries its own DMRS.

The 5G-NR air interface may utilize BWPs for various purposes. For example, BWP can be used for dynamic adaptation of the SCS. For example, the UE 102 can be configured with multiple BWPs where each BWP configuration has a different SCS. When a BWP change is indicated to the UE 102, the SCS of the transmission is changed as well. Another use case example of BWP is related to power saving. In particular, multiple BWPs can be configured for the UE 102 with different amount of frequency resources (e.g., PRBs) to support data transmission under different traffic loading scenarios. A BWP containing a smaller number of PRBs can be used for data transmission with small traffic load while allowing power saving at the UE 102 and in some cases at the gNB 116. A BWP containing a larger number of PRBs can be used for scenarios with higher traffic load.

A BWP is a subset of contiguous common resource blocks defined in clause 4.4.4.3 of [TS38211] or a given numerology $\mu_i$ in BWP i on a given carrier. The starting position $N_{BWP,i}^{start,\mu}$ and the number of RBs $N_{BWP,i}^{size,\mu}$ in a BWP fulfils $N_{grid,x}^{start,\mu} \leq N_{BWP,i}^{start,\mu} < N_{grid,x}^{start,\mu} + N_{grid,x}^{size,\mu}$ and $N_{grid,x}^{start,\mu} < N_{BWP,i}^{start,\mu} + N_{BWP,i}^{start,\mu} + N_{BWP,i}^{size,\mu}$, respectively. Configuration of a BWP is described in clause 12 of [TS38213]. The UE 102 can be configured with up to four BWPs in the downlink with a single downlink BWP being active at a given time. The UE is not expected to receive PDSCH, PDCCH, or CSI-RS (except for RRM) outside an active BWP. The UE 102 can be configured with up to four BWPs in the uplink with a single uplink BWP being active at a given time. If the UE 102 is configured with a supplementary uplink, the UE 102 can in addition be configured with up to four BWPs in the supplementary uplink with a single supplementary uplink BWP being active at a given time. The UE 102 does not transmit PUSCH or PUCCH outside an active BWP. For an active cell, UE 102 does not transmit SRS outside an active BWP.

The RAN 104 is communicatively coupled to CN 120, which includes network elements and/or network functions (NFs) to provide various functions to support data and telecommunications services to customers/subscribers (e.g., UE 102). The network elements and/or NFs may be implemented by one or more servers 121, 141. The components of the CN 120 may be implemented in one physical node or separate physical nodes. In some embodiments, NFV may be utilized to virtualize any or all of the functions provided by the network elements of the CN 120 onto physical compute/storage resources in servers, switches, etc. A logical instantiation of the CN 120 may be referred to as a network slice, and a logical instantiation of a portion of the CN 120 may be referred to as a network sub-slice.

The CN 120 may be an LTE CN 122 (also referred to as an Evolved Packet Core (EPC) 122). The EPC 122 may include MME, SGW, SGSN, HSS, PGW, PCRF, and/or other NFs coupled with one another over various interfaces (or "reference points") (not shown). The CN 120 may be a 5GC 140 including an AUSF, AMF, SMF, UPF, NSSF, NEF, NRF, PCF, UDM, AF, and/or other NFs coupled with one another over various service-based interfaces and/or reference points. The 5GC 140 may enable edge computing by selecting operator/3rd party services to be geographically close to a point that the UE 102 is attached to the network. This may reduce latency and load on the network. In edge computing implementations, the 5GC 140 may select a UPF close to the UE 102 and execute traffic steering from the UPF to DN 136 via the N6 interface. This may be based on the UE subscription data, UE location, and information provided by the AF, which allows the AF to influence UPF (re)selection and traffic routing.

The data network (DN) 136 may represent various network operator services, Internet access, or third party services that may be provided by one or more servers including, for example, application (app)/content server 138. The DN 136 may be an operator external public, a private PDN, or an intra-operator packet data network, for example, for provision of IMS services. In this embodiment, the server 138 can be coupled to an IMS via an S-CSCF or the I-CSCF. In some implementations, the DN 136 may represent one or more local area DNs (LADNs), which are DNs 136 (or DN names (DNNs)) that is/are accessible by a UE 102 in one or more specific areas. Outside of these specific areas, the UE 102 is not able to access the LADN/DN 136.

Additionally or alternatively, the DN 136 may be an Edge DN 136, which is a (local) Data Network that supports the architecture for enabling edge applications. In these embodiments, the app server 138 may represent the physical hardware systems/devices providing app server functionality and/or the application software resident in the cloud or at an edge compute node that performs server function(s). In some embodiments, the app/content server 138 provides an edge hosting environment that provides support required for Edge Application Server's execution.

In some embodiments, the 5GS can use one or more edge compute nodes to provide an interface and offload processing of wireless communication traffic. In these embodiments, the edge compute nodes may be included in, or co-located with one or more RAN 110, 114. For example, the edge compute nodes can provide a connection between the RAN 114 and UPF in the 5GC 140. The edge compute nodes can use one or more NFV instances instantiated on virtualization infrastructure within the edge compute nodes to process wireless connections to and from the RAN 114 and a UPF.

In some implementations, the system 100 may include an SMSF, which is responsible for SMS subscription checking and verification, and relaying SM messages to/from the UE 102 to/from other entities, such as an SMS-GMSC/IWMSC/SMS-router. The SMS may also interact with AMF and UDM for a notification procedure that the UE 102 is available for SMS transfer (e.g., set a UE not reachable flag, and notifying UDM when UE 102 is available for SMS).

As alluded to previously, the UE 102 may be configured for beam management, where the UE 102 measures one or more beams of a cell and the measurement results (e.g., power values) are averaged to derive cell quality. In doing so, the UE 102 is configured to consider a subset of the detected beams, such as the X best beams above an absolute threshold (where X is a number). Filtering takes place at two different levels: at the PHY layer to derive beam quality and then at the RRC level to derive cell quality from multiple beams. Cell quality from beam measurements is derived in the same way for the serving cell(s) and for the non-serving cell(s). Measurement reports may contain the measurement results of the X best beams if the UE 102 is configured to do so by the gNB 116 (where X is a number).

The UE 102 derives cell measurement results by measuring one or multiple beams per cell as configured by the network. For all cell measurement results, the UE 102 applies layer 3 (L3) filtering before using the measured results for evaluation of reporting criteria and measurement reporting. For cell measurements, the network can configure Reference Signal Received Power (RSRP), Reference Signal Received Quality (RSRQ), and/or Signal-to-Interference plus Noise Ratio (SINR) as a trigger quantity. Reporting quantities can be the same as the trigger quantity or combinations of quantities (e.g., RSRP and RSRQ; RSRP and SINR; RSRQ and SINR; RSRP, RSRQ and SINR). In other embodiments, other measurements and/or combinations of measurements may be used as a trigger quantity such as those discussed in 3GPP TS 36.214 v15.3.0 (2018 Sep. 27) (hereinafter "[TS36214]"), 3GPP TS 38.215 v15.5.0 (2019 Jun. 24) (hereinafter "[TS38215]"), Institute of Electrical and Electronics Engineers (IEEE) Standards Association, "IEEE Computer Society: "Part 11: Wireless LAN Medium Access Control (MAC) and Physical Layer (PHY) Specifications", IEEE Std 802.11™-2012 (2012) (hereinafter "[IEEE80211]"), and/or the like.

The network may also configure the UE 102 to report measurement information per beam, which can either be measurement results per beam with respective beam identifier(s) or only beam identifier(s)). If beam measurement information is configured to be included in measurement reports, the UE 102 applies the L3 beam filtering. However, the exact L1 filtering of beam measurements used to derive cell measurement results is implementation dependent. For channel state estimation purposes, the UE 102 may be configured to measure CSI-RS resources and estimate a downlink channel state based on the CSI-RS measurements. The UE 102 feeds the estimated channel state back to the AN 108 (e.g., gNB 116) to be used in link adaptation.

Figure 3:
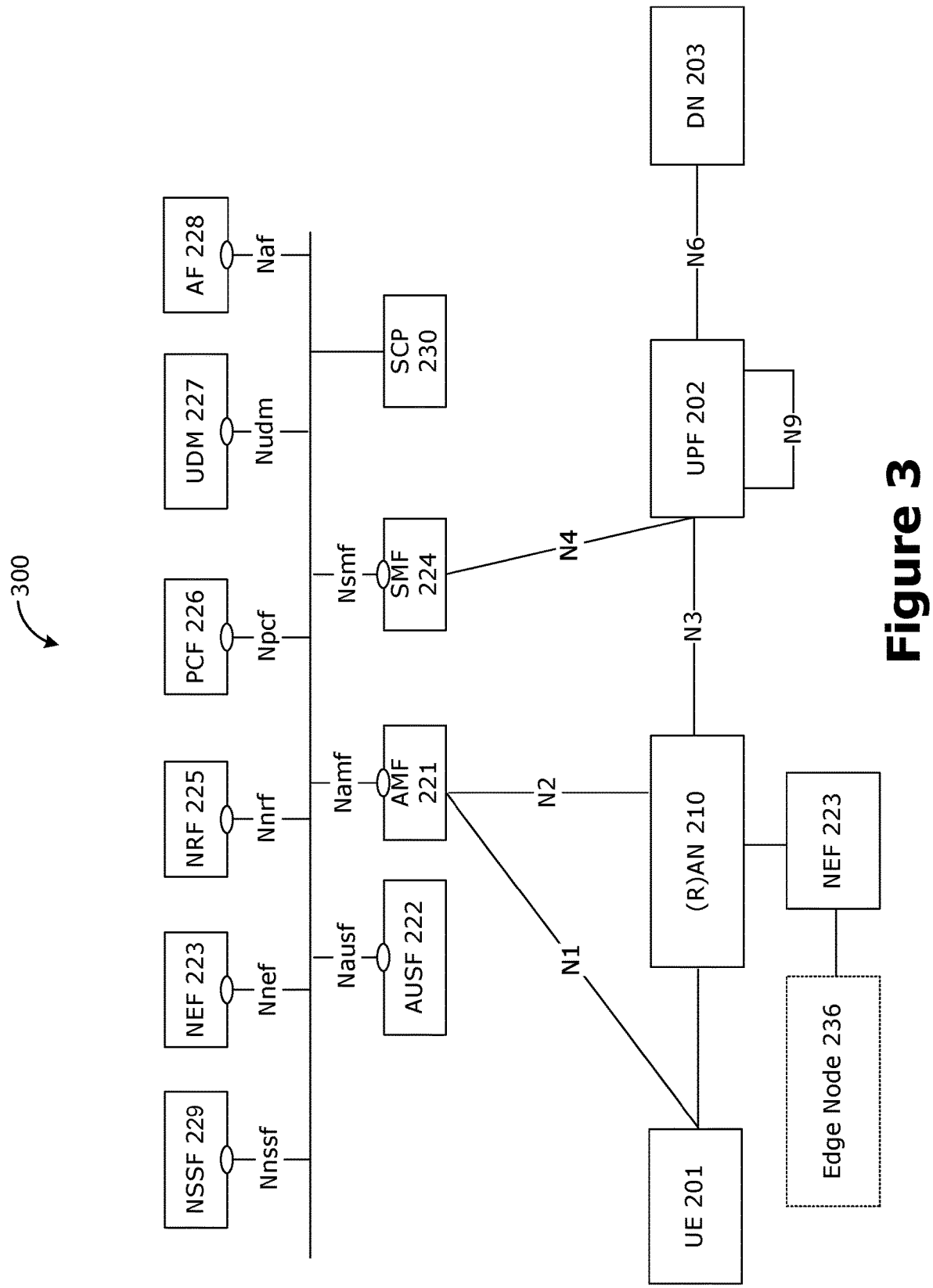

FIGS. 2 and 3 illustrate example system architectures 200 and 300 (collectively, system 200) of a 5GC such as CN 141 of FIG. 1, in accordance with various embodiments. In particular, FIG. 2 shows an exemplary 5G system architecture 200 in a reference point representation where interactions between NFs are represented by corresponding point-to-point reference points Ni, and FIG. 3 illustrates an exemplary 5G system architecture 300D in a service-based representation where interactions between NFs are represented by corresponding service-based interfaces. The system 200 is shown to include a UE 201, which may be the same or similar to the UEs 102 discussed previously; a (R)AN 210, which may be the same or similar to the AN 108 discussed previously; and a DN 203, which may be, for example, operator services, Internet access or 3rd party services, and may correspond with a PDN; and a 5GC 220. The 5GC 220 may include an AUSF 222; an AMF 221; a SMF 224; a NEF 223; a PCF 226; a NRF 225; a UDM 227; an AF 228; a UPF 202; a NSSF 229; and SCP 230.

The reference point representation of FIG. 2 shows various interactions between corresponding NFs. For example, FIG. 2 illustrates the following reference points: N1 (between the UE 201 and the AMF 221), N2 (between the RAN 210 and the AMF 221), N3 (between the RAN 210 and the UPF 202), N4 (between the SMF 224 and the UPF 202), N5 (between the PCF 226 and the AF 228), N6 (between the UPF 202 and the DN 203), N7 (between the SMF 224 and the PCF 226), N8 (between the UDM 227 and the AMF 221), N9 (between two UPFs 202), N10 (between the UDM 227 and the SMF 224), N11 (between the AMF 221 and the SMF 224), N12 (between the AUSF 222 and the AMF 221), N13 (between the AUSF 222 and the UDM 227), N14 (between two AMFs 221), N15 (between the PCF 226 and the AMF 221 in case of a non-roaming scenario, or between the PCF 226 and a visited network and AMF 221 in case of a roaming scenario), N16 (between two SMFs; not shown), and N22 (between AMF 221 and NSSF 225). Other reference point representations not shown in FIG. 2 can also be used.

The service-based representation of FIG. 3 represents NFs within the control plane that enable other authorized NFs to access their services. In this regard, 5G system architecture 300 can include the following service-based interfaces: Namf (a service-based interface exhibited by the AMF 221), Nsmf (a service-based interface exhibited by the SMF 224), Nnef 364C (a service-based interface exhibited by the NEF 223), Npcf (a service-based interface exhibited by the PCF 226), Nudm (a service-based interface exhibited by the UDM 227), Naf (a service-based interface exhibited by the AF 228), Nnrf (a service-based interface exhibited by the NRF 225), Nnssf (a service-based interface exhibited by the NSSF 229), Nausf (a service-based interface exhibited by the AUSF 222). Other service-based interfaces (e.g., Nudr, N5g-eir, and Nudsf) not shown in FIG. 3 can also be used. In embodiments, the NEF 223 can provide an interface to Edge node 236, which can be used to process wireless connections with the RAN 210.

The UPF 202 acts as an anchor point for intra-RAT and inter-RAT mobility, an e5ernal PDU session point of interconnect to DN 203, which can include, for example, operator services, Internet access, or third-party services; and a branching point to support multi-homed PDU session. The UPF 202 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 202 may include an uplink classifier to support routing traffic flows to a data network. The DN 203 may represent various network operator services, Internet access, or third party services. DN 203 may include, or be similar to, application server(s) XE150 discussed previously. The UPF 202 may interact with the SMF 224 via an N4 reference point between the SMF 224 and the UPF 202.

The AUSF 222 stores data for authentication of UE 201 and handle authentication-related functionality. The AUSF 222 may facilitate a common authentication framework for various access types. The AUSF 222 may communicate with the AMF 221 via an N12 reference point between the AMF 221 and the AUSF 222; and may communicate with the UDM 227 via an N13 reference point between the UDM 227 and the AUSF 222. Additionally, the AUSF 222 may exhibit an Nausf service-based interface.

The UDM 227 may handle subscription-related information to support the network entities' handling of communication sessions, and may store subscription data of UE 201. For example, subscription data may be communicated between the UDM 227 and the AMF 221 via an N8 reference point between the UDM 227 and the AMF. The UDM 227 may include two parts, an application FE and a UDR (the FE and UDR are not shown by FIG. 2). The UDR may store subscription data and policy data for the UDM 227 and the PCF 226, and/or structured data for exposure and application data (including PFDs for application detection, application request information for multiple UEs 201) for the NEF 223. The Nudr service-based interface may be exhibited by the UDR 221 to allow the UDM 227, PCF 226, and NEF 223 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 224 via an N10 reference point between the UDM 227 and the SMF 224. UDM 227 may also support SMS management, wherein an SMS-FE implements the similar application logic as discussed previously. Additionally, the UDM 227 may exhibit the Nudm service-based interface.

In some aspects, the UDM 227 can be coupled to an application server 240, which can include a telephony application server (TAS) or another application server (AS) including a Edge node 236. The AS 240 can be coupled to an IMS via an S-CSCF or the I-CSCF. The 5G system architecture 200 can use one or more Edge nodes 236 to provide an interface and offload processing of wireless communication traffic. For example and as illustrated in FIG. 2, the Edge node 236 can provide a connection between the RAN 210 and UPF 203 in the CN. The Edge node 236 can use one or more NFV instances instantiated on virtualization infrastructure within the Edge node 236 to process wireless connections to and from the RAN 210 and the UPF 203.

In embodiments, the edge node 236 may include or be part of an edge system (or edge network). The edge node 236 may also be referred to as "edge hosts 236" or "edge servers 236." The edge system includes a collection of edge servers 236 and edge management systems (not shown) necessary to run edge computing applications within an operator network or a subset of an operator network. The edge servers 236 are physical computer systems that may include an edge platform and/or virtualization infrastructure, and provide compute, storage, and network resources to edge computing applications. Each of the edge servers 236 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to UEs 101, 201 The VI of the edge servers 236 provide virtualized environments and virtualized resources for the edge hosts, and the edge computing applications may run as VMs and/or application containers on top of the VI. Various edge computing/networking technologies in various combinations and layouts of devices located at the edge of a network may be used. Examples of such edge computing/networking technologies that may implement the embodiments herein include ETSI MEC; CDNs Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used to practice the embodiments herein.

The AMF 221 may be responsible for registration management (e.g., for registering UE 201, etc.), connection management, reachability management, mobility management, and lawful interception of AMF-related events, and access authentication and authorization. The AMF 221 may be a termination point for the N11 reference point between the AMF 221 and the SMF 224. The AMF 221 may provide transport for SM messages between the UE 201 and the SMF 224, and act as a transparent proxy for routing SM messages. AMF 221 may also provide transport for SMS messages between UE 201 and an SMSF (not shown by FIG. 2). AMF 221 may act as SEAF, which may include interaction with the AUSF 222 and the UE 201, receipt of an intermediate key that was established as a result of the UE 201 authentication process. Where USIM based authentication is used, the AMF 221 may retrieve the security material from the AUSF 222. AMF 221 may also include a SCM function, which receives a key from the SEA that it uses to derive access-network specific keys. Furthermore, AMF 221 may be a termination point of a RAN CP interface, which may include or be an N2 reference point between the (R)AN 210 and the AMF 221; and the AMF 221 may be a termination point of NAS (N1) signalling, and perform NAS ciphering and integrity protection.

AMF 221 may also support NAS signalling with a UE 201 over an N3 IWF interface. The N3IWF may be used to provide access to untrusted entities. N3IWF may be a termination point for the N2 interface between the (R)AN 210 and the AMF 221 for the control plane, and may be a termination point for the N3 reference point between the (R)AN 210 and the UPF 202 for the user plane. As such, the AMF 221 may handle N2 signalling from the SMF 224 and the AMF 221 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated with such marking received over N2. N3IWF may also relay uplink and downlink control-plane NAS signalling between the UE 201 and AMF 221 via an N1 reference point between the UE 201 and the AMF 221, and relay uplink and downlink user-plane packets between the UE 201 and UPF 202. The N3IWF also provides mechanisms for IPsec tunnel establishment with the UE 201. The AMF 221 may exhibit an Namf service-based interface, and may be a termination point for an N14 reference point between two AMFs 221 and an N17 reference point between the AMF 221 and a 5G-EIR (not shown by FIG. 2).

The UE 201 may need to register with the AMF 221 in order to receive network services. RM is used to register or deregister the UE 201 with the network (e.g., AMF 221), and establish a UE conte5 in the network (e.g., AMF 221). The UE 201 may operate in an RM-REGISTERED state or an RM-DEREGISTERED state. In the RM-DEREGISTERED state, the UE 201 is not registered with the network, and the UE conte5 in AMF 221 holds no valid location or routing information for the UE 201 so the UE 201 is not reachable by the AMF 221. In the RM-REGISTERED state, the UE 201 is registered with the network, and the UE conte5 in AMF 221 may hold a valid location or routing information for the UE 201 so the UE 201 is reachable by the AMF 221. In the RM-REGISTERED state, the UE 201 may perform mobility Registration Update procedures, perform periodic Registration Update procedures triggered by expiration of the periodic update timer (e.g., to notify the network that the UE 201 is still active), and perform a Registration Update procedure to update UE capability information or to re-negotiate protocol parameters with the network, among others.

The AMF 221 may store one or more RM conte5s for the UE 201, where each RM conte5 is associated with a specific access to the network. The RM conte5 may be a data structure, database object, etc. that indicates or stores, inter alia, a registration state per access type and the periodic update timer. The AMF 221 may also store a 5GC MM conte5 that may be the same or similar to the (E)MM conte5 discussed previously. In various embodiments, the AMF 221 may store a CE mode B Restriction parameter of the UE 201 in an associated MM conte5 or RM conte5. The AMF 221 may also derive the value, when needed, from the UE's usage setting parameter already stored in the UE conte5 (and/or MM/RM conte5).

CM may be used to establish and release a signaling connection between the UE 201 and the AMF 221 over the N1 interface. The signaling connection is used to enable NAS signaling exchange between the UE 201 and the CN 220, and comprises both the signaling connection between the UE and the AN (e.g., RRC connection or UE-N3IWF connection for non-3GPP access) and the N2 connection for the UE 201 between the AN (e.g., RAN 210) and the AMF 221. The UE 201 may operate in one of two CM states, CM-IDLE mode or CM-CONNECTED mode. When the UE 201 is operating in the CM-IDLE state/mode, the UE 201 may have no NAS signaling connection established with the AMF 221 over the N1 interface, and there may be (R)AN 210 signaling connection (e.g., N2 and/or N3 connections) for the UE 201. When the UE 201 is operating in the CM-CONNECTED state/mode, the UE 201 may have an established NAS signaling connection with the AMF 221 over the N1 interface, and there may be a (R)AN 210 signaling connection (e.g., N2 and/or N3 connections) for the UE 201. Establishment of an N2 connection between the (R)AN 210 and the AMF 221 may cause the UE 201 to transition from CM-IDLE mode to CM-CONNECTED mode, and the UE 201 may transition from the CM-CONNECTED mode to the CM-IDLE mode when N2 signaling between the (R)AN 210 and the AMF 221 is released.

The AMF 221 also supports various paging strategy handling functions. Based on operator configuration, the 5GS supports the AMF 221 and NG-RAN 210 to apply different paging strategies for different types of traffic. In the case of UE 201 in CM-IDLE state, the AMF 221 performs paging and determines the paging strategy based on, for example, local configuration, what NF triggered the paging and information available in the request that triggered the paging. If NWDAF is deployed, the AMF 221 may also use analytics (e.g., statistics or predictions) on the UE's 201 mobility as provided by NWDAF (see e.g., 3GPP TS 23.288). When the UE 201 is in CM-CONNECTED with RRC Inactive state, the NG-RAN 210 performs paging and determines the paging strategy based on, for example, local configuration, and information received from AMF 221 as described in clause 5.4.6.3 of [1] and SMF 224 as described in clause 5.4.3.2 of [1]. In the case of Network Triggered Service Request from SMF 224, the SMF 224 determines the 5QI and ARP based on the downlink data or the notification of downlink data received from UPF 202. The SMF 224 includes the 5QI and ARP corresponding to the received downlink PDU in the request sent to the AMF 221. If the UE 201 is in CM IDLE, the AMF 221 uses, for example, the 5QI and ARP to derive different paging strategies as described in 3GPP TS 23.502, clause 4.2.3.3. The 5QI is used by the AMF 221 to determine suitable paging strategies.

The AMF 221 handles PPD according to the various embodiments disscussed herein. The AMF 221 also handles paging priority. Paging Priority is a feature that allows the AMF 221 to include an indication in the Paging Message sent to NG-RAN 210 that the UE 201 be paged with priority. The decision by the AMF 221 whether to include Paging Priority in the Paging Message is based on the ARP value in the message received from the SMF 224 for an IP packet waiting to be delivered in the UPF. If the ARP value is associated with select priority services (e.g., MPS, MCS), the AMF 221 includes Paging Priority in the Paging Message. When the NG-RAN 210 receives a Paging Message with Paging Priority, it handles the page with priority. The AMF 221 while waiting for the UE to respond to a page sent without priority receives another message from the SMF 224 with an ARP associated with select priority services (e.g., MPS, MCS), the AMF 221 sends another Paging message to the (R)AN 210 including the Paging Priority. For subsequent messages, the AMF 221 may determine whether to send the Paging message with higher Paging Priority based on local policy. For the UE 201 in RRC Inactive state, the NG-RAN 210 determines Paging Priority based on the ARP associated with the QoS Flow as provisioned by the operator policy, and the Core Network Assisted RAN paging information from AMF 221 as described in clause 5.4.6.3 of [1].

The SMF 224 may be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 201 and a data network (DN) 203 identified by a Data Network Name (DNN). PDU sessions may be established upon UE 201 request, modified upon UE 201 and 5GC 220 request, and released upon UE 201 and 5GC 220 request using NAS SM signaling exchanged over the N1 reference point between the UE 201 and the SMF 224. Upon request from an application server, the 5GC 220 may trigger a specific application in the UE 201. In response to receipt of the trigger message, the UE 201 may pass the trigger message (or relevant parts/information of the trigger message) to one or more identified applications in the UE 201. The identified application(s) in the UE 201 may establish a PDU session to a specific DNN. The SMF 224 may check whether the UE 201 requests are compliant with user subscription information associated with the UE 201. In this regard, the SMF 224 may retrieve and/or request to receive update notifications on SMF 224 level subscription data from the UDM 227.

The SMF 224 may include the following roaming functionality: handling local enforcement to apply QoS SLAs (VPLMN); charging data collection and charging interface (VPLMN); lawful intercept (in VPLMN for SM events and interface to LI system); and support for interaction with e5ernal DN for transport of signalling for PDU session authorization/authentication by e5ernal DN. An N16 reference point between two SMFs 224 may be included in the system 200, which may be between another SMF 224 in a visited network and the SMF 224 in the home network in roaming scenarios. Additionally, the SMF 224 may exhibit the Nsmf service-based interface.

The NEF 223 may provide means for securely exposing the services and capabilities provided by 3GPP network functions for third party, internal exposure/re-exposure, Application Functions (e.g., AF 228), edge computing or fog computing systems, etc. In such embodiments, the NEF 223 may authenticate, authorize, and/or throttle the AFs. NEF 223 may also translate information exchanged with the AF 228 and information exchanged with internal network functions. For example, the NEF 223 may translate between an AF-Service-Identifier and an internal 5GC information. NEF 223 may also receive information from other network functions (NFs) based on exposed capabilities of other network functions. This information may be stored at the NEF 223 as structured data, or at a data storage NF using standardized interfaces. The stored information can then be re-exposed by the NEF 223 to other NFs and AFs, and/or used for other purposes such as analytics. Additionally, the NEF 223 may exhibit an Nnef service-based interface.

The NRF 225 may support service discovery functions, receive NF discovery requests from NF instances, and provide the information of the discovered NF instances to the NF instances. NRF 225 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 225 may exhibit the Nnrf service-based interface. The NRF 225 also supports service discovery functions, wherein the NRF 225 receives NF Discovery Request from NF instance or the SCP 230, and provides the information of the discovered NF instances (be discovered) to the NF instance or SCP 230.

The PCF 226 may provide policy rules to control plane function(s) to enforce them, and may also support unified policy framework to govern network behaviour. The PCF 226 may also implement an FE to access subscription information relevant for policy decisions in a UDR of the UDM 227. The PCF 226 may communicate with the AMF 221 via an N15 reference point between the PCF 226 and the AMF 221, which may include a PCF 226 in a visited network and the AMF 221 in case of roaming scenarios. The PCF 226 may communicate with the AF 228 via an N5 reference point between the PCF 226 and the AF 228; and with the SMF 224 via an N7 reference point between the PCF 226 and the SMF 224. The system 200 and/or CN 220 may also include an N24 reference point between the PCF 226 (in the home network) and a PCF 226 in a visited network. Additionally, the PCF 226 may exhibit an Npcf service-based interface.

The AF 228 may provide application influence on traffic routing, provide access to the NCE, and interact with the policy framework for policy control. The NCE may be a mechanism that allows the 5GC 220 and AF 228 to provide information to each other via NEF 223, which may be used for edge computing implementations. In such implementations, the network operator and third party services may be hosted close to the UE 201 access point of attachment to achieve an efficient service delivery through the reduced end-to-end latency and load on the transport network. For edge computing implementations, the 5GC may select a UPF 202 close to the UE 201 and execute traffic steering from the UPF 202 to DN 203 via the N6 interface. This may be based on the UE subscription data, UE location, and information provided by the AF 228. In this way, the AF 228 may influence UPF (re)selection and traffic routing. Based on operator deployment, when AF 228 is considered to be a trusted entity, the network operator may permit AF 228 to interact directly with relevant NFs. Additionally, the AF 228 may exhibit an Naf service-based interface.

The NSSF 229 may select a set of network slice instances serving the UE 201. The NSSF 229 may also determine allowed NSSAI and the mapping to the subscribed S-NS-SAIs, if needed. The NSSF 229 may also determine the AMF set to be used to serve the UE 201, or a list of candidate AMF(s) 221 based on a suitable configuration and possibly by querying the NRF 225. The selection of a set of network slice instances for the UE 201 may be triggered by the AMF 221 with which the UE 201 is registered by interacting with the NSSF 229, which may lead to a change of AMF 221. The NSSF 229 may interact with the AMF 221 via an N22 reference point between AMF 221 and NSSF 229; and may communicate with another NSSF 229 in a visited network via an N31 reference point (not shown by FIG. 2). Additionally, the NSSF 229 may exhibit an Nnssf service-based interface.

As discussed previously, the system 200 may include an SMSF, which may be responsible for SMS subscription checking and verification, and relaying SM messages to/from the UE 201 to/from other entities, such as an SMS-GMSC/IWMSC/SMS-router. The SMS may also interact with AMF 221 and UDM 227 for a notification procedure that the UE 201 is available for SMS transfer (e.g., set a UE not reachable flag, and notifying UDM 227 when UE 201 is available for SMS).

The SCP 230 (or individual instances of the SCP 230) supports indirect communication (see e.g., 3GPP TS 23.501 section 7.1.1); delegated discovery (see e.g., 3GPP TS 23.501 section 7.1.1); message forwarding and routing to destination NF/NF service(s), communication security (e.g., authorization of the NF Service Consumer to access the NF Service Producer API) (see e.g., 3GPP TS 33.501), load balancing, monitoring, overload control, etc.; and discovery and selection functionality for UDM(s), AUSF(s), UDR(s), PCF(s) with access to subscription data stored in the UDR based on UE's SUPI, SUCI or GPSI (see e.g., 3GPP TS 23.501 section 6.3). Load balancing, monitoring, overload control functionality provided by the SCP may be implementation specific. The SCP 230 may be deployed in a distributed manner. More than one SCP 230 can be present in the communication path between various NF Services. The SCP 230, although not an NF instance, can also be deployed distributed, redundant, and scalable.

The system architecture 200 may also include other elements that are not shown by FIG. 2 or 3, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE conte5s), via N18 reference point between any NF and the UDSF (not shown by FIG. 2). Individual NFs may share a UDSF for storing their respective unstructured data or individual NFs may each have their own UDSF located at or near the individual NFs. Additionally, the UDSF may exhibit an Nudsf service-based interface (not shown by FIG. 2). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

In another example, the 5G system architecture 200 includes an IP multimedia subsystem (IMS) as well as a plurality of IP multimedia core network subsystem entities, such as call session control functions (CSCFs) (not shown by FIG. 2 or 3). More specifically, the IMS includes a CSCF, which can act as a proxy CSCF (P-CSCF), a serving CSCF (S-CSCF), an emergency CSCF (E-CSCF), or interrogating CSCF (I-CSCF). The P-CSCF can be configured to be the first contact point for the UE 201 within the IMS. The S-CSCF can be configured to handle the session states in the network, and the E-CSCF can be configured to handle certain aspects of emergency sessions such as routing an emergency request to the correct emergency center or public safety answering point (PSAP). The I-CSCF can be configured to function as the contact point within an operator's network for all IMS connections destined to a subscriber of that network operator, or a roaming subscriber currently located within that network operator's service area. In some aspects, the I-CSCF can be connected to another IP multimedia network, for example, an IMS operated by a different network operator.

Additionally, there may be many more reference points and/or service-based interfaces between the NF services in the NFs; however, these interfaces and reference points have been omitted from FIGS. 2 and 3 for clarity. In one example, the CN 220 may include an Nx interface, which is an inter-CN interface between an MME and the AMF 221 in order to enable interworking between system 200 and an EPC. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 4:
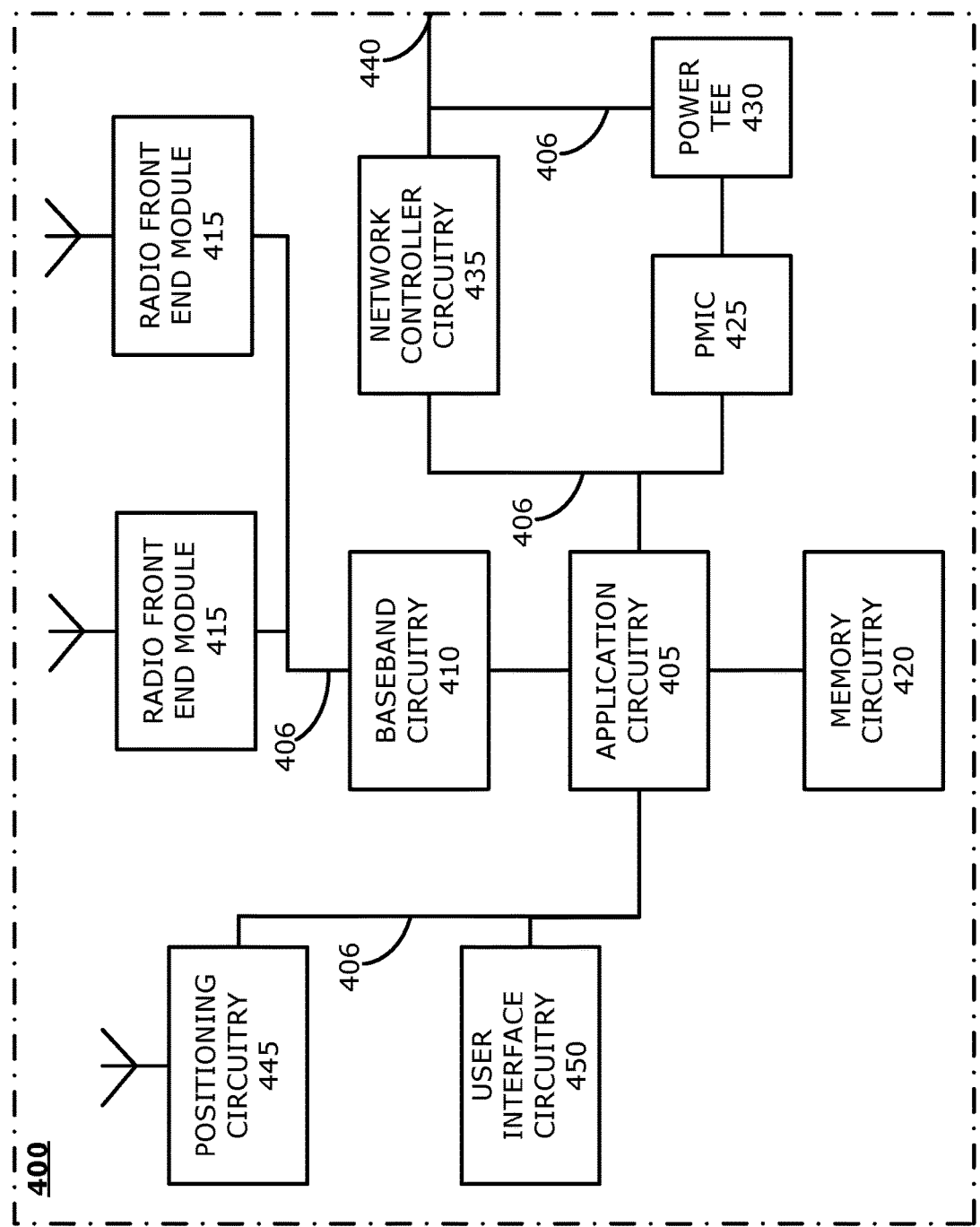
FIG. 4 illustrates an example of infrastructure equipment in accordance with various embodiments.

FIG. 4 illustrates an example of infrastructure equipment 400 in accordance with various embodiments. The infrastructure equipment 400 (or "system 400") may be implemented as a base station, radio head, RAN node such as the RAN nodes 111 and/or AP 106 shown and described previously, application server(s) 130, and/or any other element/device discussed herein. In other examples, the system 400 could be implemented in or by a UE.

The system 400 includes application circuitry 405, baseband circuitry 410, one or more radio front end modules (RFEMs) 415, memory circuitry 420, power management integrated circuitry (PMIC) 425, power tee circuitry 430, network controller circuitry 435, network interface connector 440, satellite positioning circuitry 445, and user interface 450. In some embodiments, the device 400 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 405 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry x05 may be coupled with or may include memory/storage elements and may be configured to execute instructions stored in the memory/storage to enable various applications or operating systems to run on the system 400. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 405 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 405 may comprise, or may be, a special-purpose processor/controller to operate according to the various embodiments herein. As examples, the processor(s) of application circuitry 405 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 400 may not utilize application circuitry 405, and instead may include a special-purpose processor/controller to process IP data received from an EPC or 5GC, for example.

In some implementations, the application circuitry 405 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 405 may comprise logic blocks or logic fabric, and other interconnected resources that may be programmed to perform various functions, such as the procedures, methods, functions, etc. of the various embodiments discussed herein. In such embodiments, the circuitry of application circuitry 405 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 410 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 410 are discussed infra with regard to FIG. 5.

User interface circuitry 450 may include one or more user interfaces designed to enable user interaction with the system 400 or peripheral component interfaces designed to enable peripheral component interaction with the system 400. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 415 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 5111 of FIG. 5 infra), and the RFEM may be connected to multiple antennas. In alternative implementations, both mmWave and sub-mmWave radio functions may be implemented in the same physical RFEM 415, which incorporates both mmWave antennas and sub-mmWave.

The memory circuitry 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 420 may be implemented as one or more of solder down packaged integrated circuits, socketed memory modules and plug-in memory cards.

The PMIC 425 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 430 may provide for electrical power drawn from a network cable to provide both power supply and data connectivity to the infrastructure equipment 400 using a single cable.

The network controller circuitry 435 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 400 via network interface connector 440 using a physical connection, which may be electrical (commonly referred to as a "copper interconnect"), optical, or wireless. The network controller circuitry 435 may include one or more dedicated processors and/or FPGAs to communicate using one or more of the aforementioned protocols. In some implementations, the network controller circuitry 435 may include multiple controllers to provide connectivity to other networks using the same or different protocols.

The positioning circuitry 445 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 445 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 445 may include a Micro-Technology for Positioning, Navigation, and Timing (Micro-PNT) IC that uses a master timing clock to perform position tracking/estimation without GNSS assistance. The positioning circuitry 445 may also be part of, or interact with, the baseband circuitry 410 and/or RFEMs 415 to communicate with the nodes and components of the positioning network. The positioning circuitry 445 may also provide position data and/or time data to the application circuitry 405, which may use the data to synchronize operations with various infrastructure (e.g., RAN nodes 111, etc.), or the like.

The components shown by FIG. 4 may communicate with one another using interface circuitry, which may include any number of bus and/or interconnect (IX) technologies such as ISA, e5ended ISA, I2C, SPI, point-to-point interfaces, power management bus (PMBus), PCI, PCIe, PCIx, Intel® UPI, Intel® IAL, Intel® CXL, CAPI, OpenCAPI, Intel® QPI, UPI, Intel@OPA IX, RapidIO™ system IXs, CCIX, Gen-Z Consortium IXs, a HyperTransport interconnect, NVLink provided by NVIDIA®, and/or any number of other IX technologies. The IX technology may be a proprietary bus, for example, used in an SoC based system.

Figure 5:
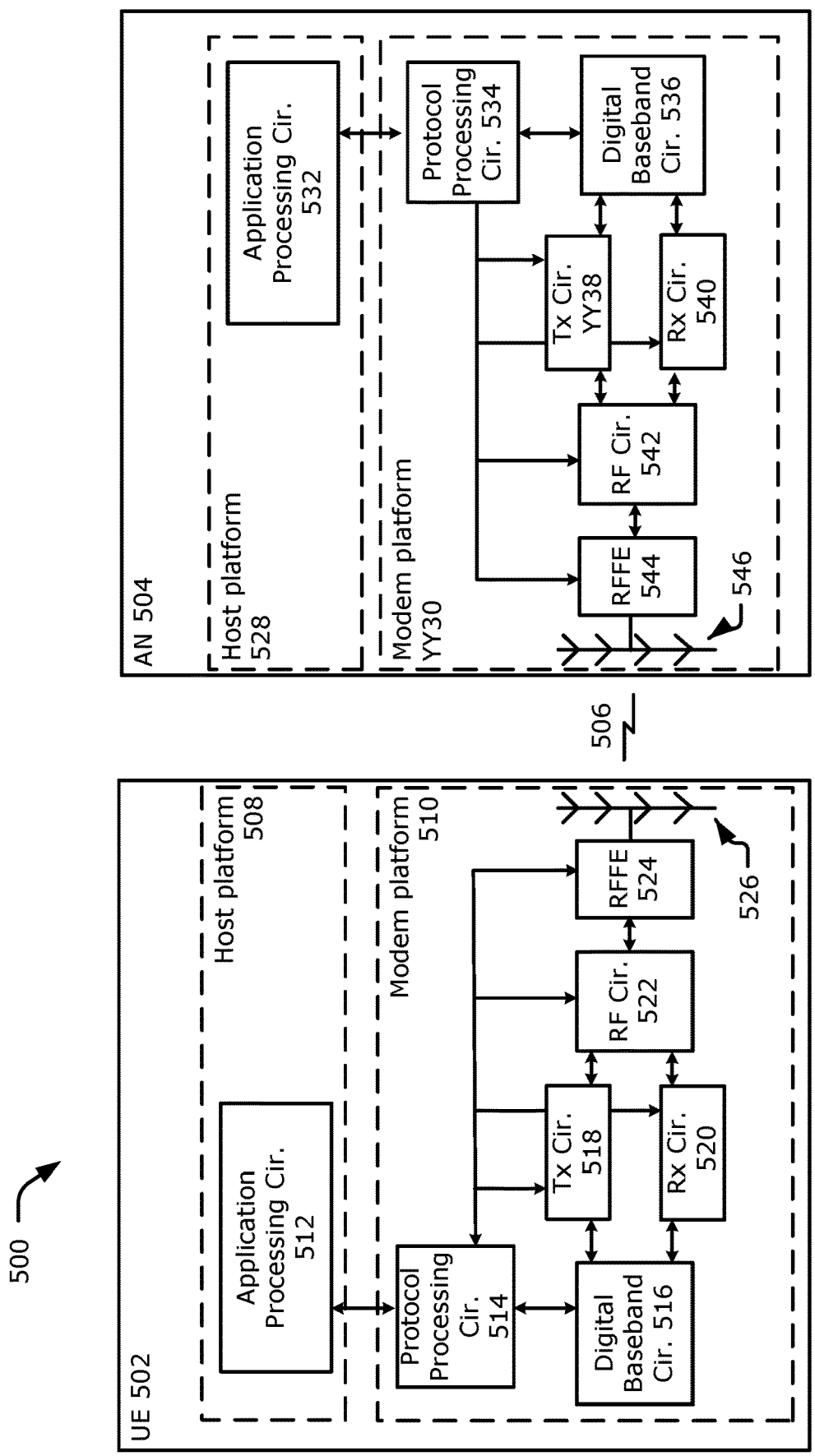
FIG. 5 schematically illustrates a wireless network in accordance with various embodiments.

FIG. 5 schematically illustrates a wireless network 500 in accordance with various embodiments. The wireless network 500 includes a UE 502 in wireless communication with an AN 504. The UE 502 and AN 504 may be the same, similar to, and/or substantially interchangeable with, like-named components described elsewhere herein such as the UE 102 and RAN 104 of FIG. 1, and/or system 400 of FIG. 4.

The UE 502 may be communicatively coupled with the AN 504 via connection 506. The connection 506 is illustrated as an air interface to enable communicative coupling, and can be consistent with cellular communications protocols such as an LTE protocol or a 5G NR protocol operating at mmWave or sub-6 GHz frequencies.

The UE 502 may include a host platform 508 coupled with a modem platform 510. The host platform 508 may include application processing circuitry 512, which may be coupled with protocol processing circuitry 514 of the modem platform 510. The application processing circuitry 512 may run various applications for the UE 502 that source/sink application data. The application processing circuitry 512 may further implement one or more layer operations to transmit/receive application data to/from a data network. These layer operations may include transport (for example UDP) and Internet (for example, IP) operations The protocol processing circuitry 514 may implement one or more of layer operations to facilitate transmission or reception of data over the connection 506. The layer operations implemented by the protocol processing circuitry 514 may include, for example, MAC, RLC, PDCP, RRC and NAS operations.

The modem platform 510 may further include digital baseband circuitry 516 that may implement one or more layer operations that are "below" layer operations performed by the protocol processing circuitry 514 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 510 may further include transmit circuitry 518, receive circuitry 520, RF circuitry 522, and RF front end (RFFE) 524, which may include or connect to one or more antenna panels 526. Briefly, the transmit circuitry 518 may include a digital-to-analog converter, mixer, intermediate frequency (IF) components, etc.; the receive circuitry 520 may include an analog-to-digital converter, mixer, IF components, etc.; the RF circuitry 522 may include a low-noise amplifier, a power amplifier, power tracking components, etc.; RFFE 524 may include filters (for example, surface/bulk acoustic wave filters), switches, antenna tuners, beamforming components (for example, phase-array antenna components), etc. The selection and arrangement of the components of the transmit circuitry 518, receive circuitry 520, RF circuitry 522, RFFE 524, and antenna panels 526 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 514 may include one or more instances of control circuitry (not shown) to provide control functions for the transmit/receive components.

A UE reception may be established by and via the antenna panels 526, RFFE 524, RF circuitry 522, receive circuitry 520, digital baseband circuitry 516, and protocol processing circuitry 514. In some embodiments, the antenna panels 526 may receive a transmission from the AN 504 by receive-beamforming signals received by a plurality of antennas/antenna elements of the one or more antenna panels 526.

A UE transmission may be established by and via the protocol processing circuitry 514, digital baseband circuitry 516, transmit circuitry 518, RF circuitry 522, RFFE 524, and antenna panels 526. In some embodiments, the transmit components of the UE 504 may apply a spatial filter to the data to be transmitted to form a transmit beam emitted by the antenna elements of the antenna panels 526.

Similar to the UE 502, the AN 504 may include a host platform 528 coupled with a modem platform 530. The host platform 528 may include application processing circuitry 532 coupled with protocol processing circuitry 534 of the modem platform 530. The modem platform may further include digital baseband circuitry 536, transmit circuitry 538, receive circuitry 540, RF circuitry 542, RFFE circuitry 544, and antenna panels 546. The components of the AN 504 may be similar to and substantially interchangeable with like-named components of the UE 502. In addition to performing data transmission/reception as described above, the components of the AN 508 may perform various logical functions that include, for example, RNC functions such as radio bearer management, uplink and downlink dynamic radio resource management, and data packet scheduling.

Although not shown, the components of UE 502 and/or AN 504 may communicate with one another using a suitable bus or interconnect (IX) technology, which may include any number of technologies, including ISA, e5ended ISA, I2C, SPI, point-to-point interfaces, power management bus (PMBus), PCI, PCIe, PCIx, Intel® UPI, Intel® IAL, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, and/or any number of other IX technologies. The IX technology may be a proprietary bus, for example, used in an SoC based system.

Figure 6:
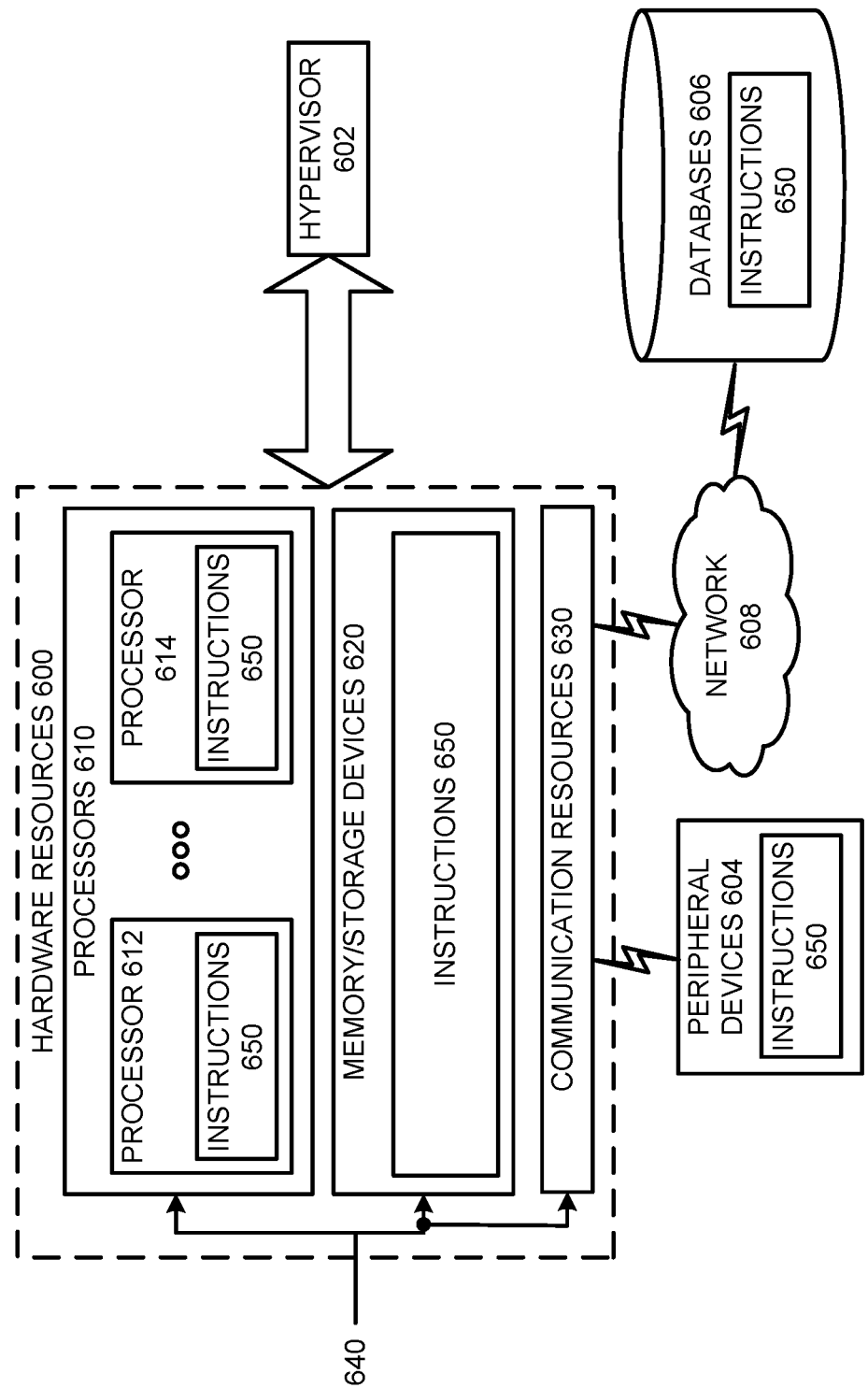
FIG. 6 is a block diagram illustrating components, according to some example embodiments, able to read instructions from a machine-readable or computer-readable medium (e.g., a non-transitory machine-readable storage medium) and perform any one or more of the methodologies discussed herein.

FIG. 6 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 6 shows a diagrammatic representation of hardware resources 600 including one or more processors (or processor cores) 610, one or more memory/storage devices 620, and one or more communication resources 630, each of which may be communicatively coupled via a bus 640. For embodiments where node virtualization (e.g., NFV) is utilized, a hypervisor 602 may be executed to provide an execution environment for one or more network slices/sub-slices to utilize the hardware resources 600.

The processors 610 may include, for example, a processor 612 and a processor 614. The processor(s) 610 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 620 may include main memory, disk storage, or any suitable combination thereof. The memory/storage devices 620 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 630 may include interconnection or network interface components or other suitable devices to communicate with one or more peripheral devices 604 or one or more databases 606 via a network 608. For example, the communication resources 630 may include wired communication components (e.g., for coupling via USB), cellular communication components, NFC components, Bluetooth® (or Bluetooth® Low Energy) components, Wi-Fi® components, and other communication components.

Instructions 650 may comprise software, a program, an application, an applet, an app, or other executable code for causing at least any of the processors 610 to perform any one or more of the methodologies discussed herein. The instructions 650 may reside, completely or partially, within at least one of the processors 610 (e.g., within the processor's cache memory), the memory/storage devices 620, or any suitable combination thereof. Furthermore, any portion of the instructions 650 may be transferred to the hardware resources 600 from any combination of the peripheral devices 604 or the databases 606. Accordingly, the memory of processors 610, the memory/storage devices 620, the peripheral devices 604, and the databases 606 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

4. Example Implementations

Figure 7:
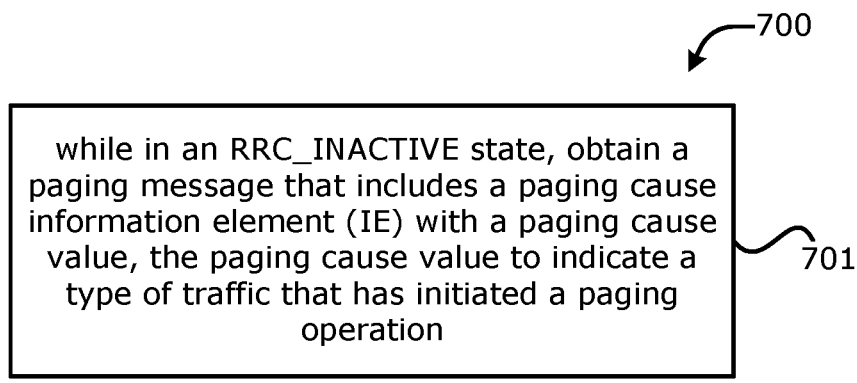
FIGS. 7, 8, 9 show an example processes for practicing various embodiments herein.
Figure 8:
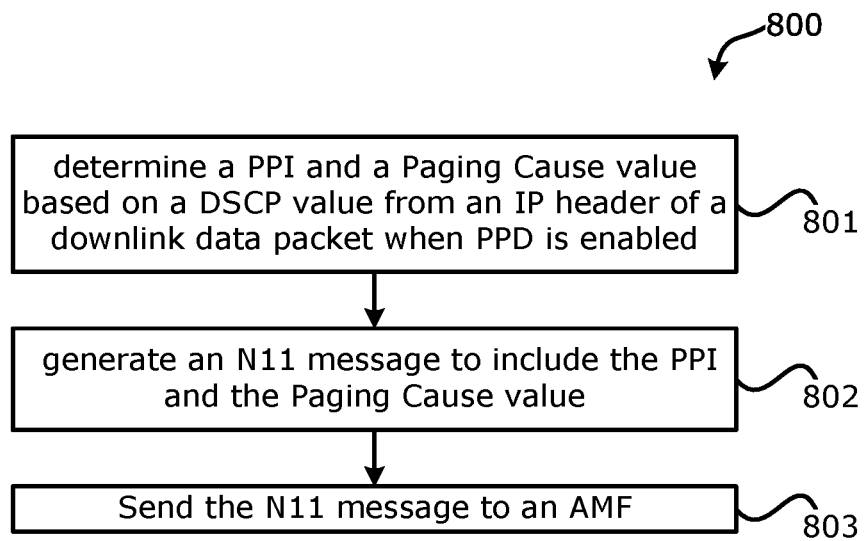
Figure 9:
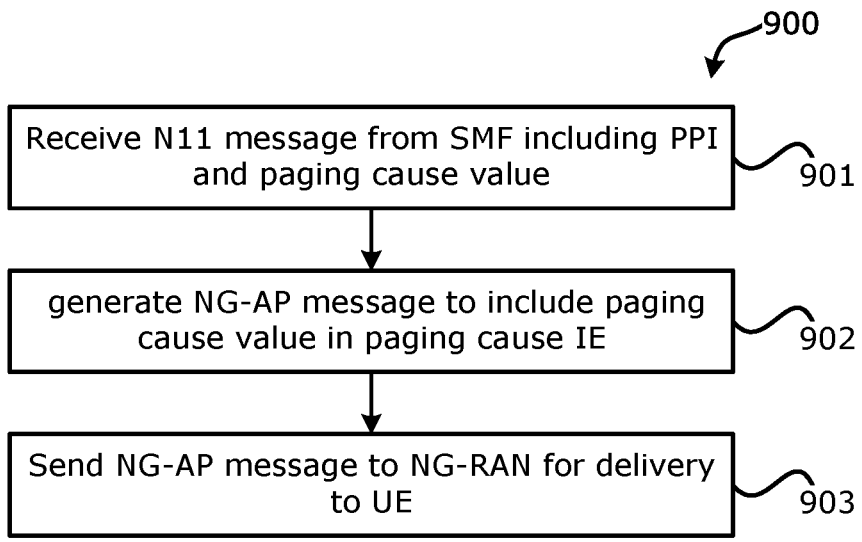

FIGS. 7, 8, and 9 illustrate processes 700, 800, and 900, respectively, in accordance with various embodiments. While particular examples and orders of operations are illustrated FIGS. 7, 8, and 9, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

Process 700 may be performed by a UE 102. Process 700 begins at operation 701 where the UE 102 while in an RRC_INACTIVE state, obtain a paging message that includes a paging cause information element (IE) with a paging cause value, the paging cause value to indicate a type of traffic that has initiated a paging operation.

Process 800 may be performed by SMF 224. Process 800 begins at operation 801 where the SMF 224 determines a PPI and a Paging Cause value based on a DSCP value from an IP header of a downlink data packet when PPD is enabled. At operation 802, the SMF 224 generates an N11 message to include the PPI and the Paging Cause value, and at operation 803, the SMF 224 sends the N11 message to AMF 221.

In some embodiments, the SMF 224 receives a message from UPF 202, which includes the DSCP value and an indication of a corresponding QoS Flow in a data notification message in case of Network Triggered Service Request and the UPF 202 buffers downlink data packets. In some embodiments, in case of Network Triggered Service Request and the SMF buffers downlink data packets, the SMF 224 determines the PPI and the Paging Cause value based on the DSCP value from the IP header of the received downlink data packet; and identifies a corresponding QoS Flow from a QoS Flow Identifier (QFI) of the received downlink data packet. In some embodiments, the SMF 224 instructs the UPF 202 to detect the DSCP value in the IP header of the downlink data packet using a downlink Packet Detection Rule (PDR) with the DSCP for this traffic; and instructs the UPF 202 to transfer the PPI and the Paging Cause value in a core network (CN) tunnel header using a Forwarding Action Rule (FAR) or a QoS Enforcement Rule (QER) with the PPI and the Paging Cause value.

Process 900 may be performed by AMF 221. Process 900 begins at operation 901 where the AMF 224 receives an N11 message from SMF 221, where the N11 message includes a Paging Policy Indicator (PPI) and a Paging Cause value. At operation 902, the AMF 224 generates an NG-AP message to include a paging cause IE, and include the paging cause value in the paging cause IE. At operation 902, the AMF 224 sends the NG-AP message to a NG-RAN 210 over an N2 interface for delivery to UE 201. In embodiments, the AMF 224 uses the PPI and the Paging Cause value to derive a paging strategy when the UE 201 is in the CM IDLE state. In some embodiments, the PPI and/or the paging cause value is/are used to apply a paging policy for when the UE 201 needs to be paged in a Radio Resource Control (RRC) Inactive state.

Additional examples of the presently described embodiments include the following, non-limiting implementations. Each of the following non-limiting examples may stand on its own or may be combined in any permutation or combination with any one or more of the other examples provided below or throughout the present disclosure.

Example A01 includes a method for paging UE in an RRC_INACTIVE state.

Example A02 includes the method of example A01 and/or some other example(s) herein, wherein the UE is provided a Paging Cause in a [Uu] Paging message.

Example A03 includes the method of example A02 and/or some other example(s) herein, wherein the Paging Cause is to indicate a type of traffic that has caused the Paging (e.g., IMS voice, IMS SMS, IMS other, non-IMS).

Example A04 includes the method of examples A02-A03 and/or some other example(s) herein, wherein the Paging Cause is determined by a Core Network.

Example A05 includes the method of examples A02-A04 and/or some other example(s) herein, wherein the Paging Cause is provided in a DL PDU SESSION INFORMATION header.

Example A06 includes the method of examples A02-A04 and/or some other example(s) herein, wherein the Paging Cause is provided in the DOWNLINK NAS TRANSPORT message.

Example B01 includes a method of operating a UE, the method comprising: processing a paging message that includes a paging cause IE with a paging cause value.

Example B02 includes the method of example B01 and/or some other example(s) herein, further comprising: receiving the paging message over a Uu interface.

Example B03 includes the method of example B01 and/or some other example(s) herein, wherein the paging cause is to indicate a type of traffic that has initiated a paging operation.

Example B04 includes the method of example B01 and/or some other example(s) herein, wherein the paging cause IE is provided in a DL PDU SESSION INFORMATION frame.

Example B05 includes the method of example B01 and/or some other example(s) herein, wherein the paging cause IE is provided in a DOWNLINK NAS TRANSPORT message.

Example C01 includes a method of operating an SMF, the method comprising: processing a DSCP received from a UPF; and determining, based on the DSCP, a paging cause.

Example C02 includes the method of example C01 and/or some other example(s) herein, wherein the paging cause is to indicate a type of traffic that has initiated a paging operation.

Example C03 includes the method of example C01 and/or some other example(s) herein, further comprising: providing an instruction to the UPF to detect the DSCP in a TOS/TC value in an IP header of a downlink PDU.

Example C04 includes the method of example C03 and/or some other example(s) herein, further comprising: providing an instruction to the UPF to transfer a PPI in a CN tunnel header using, for example, a FAR with a value of the PPI.

Example D01 includes a method of operating an AMF, the method comprising: generating a NG-AP message to include a paging cause IE, the paging cause IE to include a paging cause value; and sending the NG-AP message to an NG-RAN.

Example D02 includes the method of example D01 and/or some other example(s) herein, wherein the paging cause value is to indicate a type of traffic that has initiated a paging operation.

Example D03 includes the method of example D02 and/or some other example(s) herein, wherein the paging cause value is to indicate to the NG-RAN how the NG-RAN is to convey a paging message to a UE.

Example D04 includes the method of examples D01-D03 and/or some other example(s) herein, wherein the NG-AP message is a DOWNLINK NAS TRANSPORT message.

Example E01 includes a method of operating an NG-RAN, the method comprising: receiving, from an AMF, an NG-AP message; and processing the NG-AP message to determine a paging cause value from a paging cause IE in the NG-AP message.

Example E02 includes the method of example E01 and/or some other example(s) herein, further comprising: generating a paging message based at least in part on the paging cause value; and sending the paging message to a UE.

Example E03 includes the method of examples E01-E02 and/or some other example(s) herein, wherein the paging cause value is to indicate a type of traffic that has initiated a paging operation.

Example E04 includes the method of examples E01-E03 and/or some other example(s) herein, wherein the NG-AP message is a DOWNLINK NAS TRANSPORT message.

Example Z01 may include an apparatus comprising means to perform one or more elements of a method described in or related to any of examples A01-A06, B01-B05, C01-C04, E01-E04, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples A01-A06, B01-B05, C01-C04, E01-E04, or any other method or process described herein.

Example Z03 may include an apparatus comprising logic, modules, or circuitry to perform one or more elements of a method described in or related to any of examples A01-A06, B01-B05, C01-C04, E01-E04, or any other method or process described herein.

Example Z04 may include a method, technique, or process as described in or related to any of examples A01-A06, B01-B05, C01-C04, E01-E04, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples A01-A06, B01-B05, C01-C04, E01-E04, or portions thereof.

Example Z06 may include a signal as described in or related to any of examples A01-A06, B01-B05, C01-C04, E01-E04, or portions or parts thereof.

Example Z07 may include a datagram, packet, frame, segment, protocol data unit (PDU), or message as described in or related to any of examples A01-A06, B01-B05, C01-C04, E01-E04, or portions or parts thereof, or otherwise described in the present disclosure.

Example Z08 may include a signal encoded with data as described in or related to any of examples A01-A06, B01-B05, C01-C04, E01-E04, or portions or parts thereof, or otherwise described in the present disclosure.

Example Z09 may include a signal encoded with a datagram, packet, frame, segment, protocol data unit (PDU), or message as described in or related to any of examples A01-A06, B01-B05, C01-C04, E01-E04, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples A01-A06, B01-B05, C01-C04, E01-E04, or portions thereof.

Example Z11 may include a computer program comprising instructions, wherein execution of the program by a processing element is to cause the processing element to carry out the method, techniques, or process as described in or related to any of examples A01-A06, B01-B05, C01-C04, E01-E04, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

5. Terminology

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an Application Specific Integrated Circuit (ASIC), a field-programmable gate array (FPGA), programmable logic device (PLD), complex PLD (CPLD), high-capacity PLD (HCPLD), System-on-Chip (SoC), System-in-Package (SiP), Multi-Chip Package (MCP), digital signal processor (DSP), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including random access memory (RAM), magnetoresistive RAM (MRAM), phase change random access memory (PRAM), dynamic random access memory (DRAM) and/or synchronous dynamic random access memory (SDRAM), core memory, read only memory (ROM), magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, etc.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "architecture" as used herein refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "element" refers to a unit that is indivisible at a given level of abstraction and has a clearly defined boundary, wherein an element may be any type of entity including, for example, one or more devices, systems, controllers, network elements, modules, etc., or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

The term "SMTC" refers to an SSB-based measurement timing configuration configured by SSB-MeasurementTimingConfiguration. The term "SSB" refers to an SS/PBCH block. The term "a "Primary Cell" refers to the MCG cell, operating on the primary frequency, in which the UE either performs the initial connection establishment procedure or initiates the connection re-establishment procedure. The term "Primary SCG Cell" refers to the SCG cell in which the UE performs random access when performing the Reconfiguration with Sync procedure for DC operation. The term "Secondary Cell" refers to a cell providing additional radio resources on top of a Special Cell for a UE configured with CA. The term "Secondary Cell Group" refers to the subset of serving cells comprising the PSCell and zero or more secondary cells for a UE configured with DC. The term "Serving Cell" refers to the primary cell for a UE in RRC_CONNECTED not configured with CA/DC there is only one serving cell comprising of the primary cell. The term "serving cell" or "serving cells" refers to the set of cells comprising the Special Cell(s) and all secondary cells for a UE in RRC_CONNECTED configured with carrier aggregation (CA). The term "Special Cell" refers to the PCell of the MCG or the PSCell of the SCG for DC operation; otherwise, the term "Special Cell" refers to the Pcell.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

As used herein, the term "radio technology" refers to technology for wireless transmission and/or reception of electromagnetic radiation for information transfer. The term "radio access technology" or "RAT" refers to the technology used for the underlying physical connection to a radio based communication network. As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols may be used in various embodiments include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.11ay, etc.), V2X communication technologies (including 3GPP C-V2X), Dedicated Short Range Communications (DSRC) communication systems such as Intelligent-Transport-Systems (ITS) including the European ITS-G5, ITS-G5B, ITS-G5C, etc. In addition to the standards listed above, any number of satellite uplink technologies may be used for purposes of the present disclosure including, for example, radios compliant with standards issued by the International Telecommunication Union (ITU), or the European Telecommunications Standards Institute (ETSI), among others. The examples provided herein are thus understood as being applicable to various other communication technologies, both existing and not yet formulated.

The term "access network" refers to any network, using any combination of radio technologies, RATs, and/or communication protocols, used to connect user devices and service providers. In the context of WLANs, an "access network" is an IEEE 802 local area network (LAN) or metropolitan area network (MAN) between terminals and access routers connecting to provider services. The term "access router" refers to router that terminates a medium access control (MAC) service from terminals and forwards user traffic to information servers according to Internet Protocol (IP) addresses.

The terms "instantiate," "instantiation," and the like as used herein refers to the creation of an instance. An "instance" also refers to a concrete occurrence of an object, which may occur, for example, during execution of program code. The term "information element" refers to a structural element containing one or more fields. The term "field" refers to individual contents of an information element, or a data element that contains content. As used herein, a "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like.

The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. It should be understood, however, that there is no intent to limit the concepts of the present disclosure to the particular forms disclosed, but on the contrary, the intention is to cover all modifications, equivalents, and alternatives consistent with the present disclosure and the appended claims.

6. Abbreviations

Unless used differently herein, terms, definitions, and abbreviations may be consistent with terms, definitions, and abbreviations defined in 3GPP TR 21.905 v16.0.0 (2019-06). For the purposes of the present document, the abbreviations in the following table may apply to the examples and embodiments discussed herein.

| | |
|---|---|
| 3GPP | Third Generation Partnership Project |
| 4G | Fourth Generation |
| 5G | Fifth Generation |
| 5GC | 5G Core network |
| ACK | Acknowledgement |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |

The invention claimed is:

1. An apparatus to be employed as an Access and Mobility Management Function (AMF), the apparatus comprising:
   memory circuitry; and
   processor circuitry connected to the memory circuitry, wherein the processor circuitry is to:
      generate a next generation application protocol (NGAP) message to include a paging cause indication for voice service, and
      cause transmission of the NGAP message to a Next Generation Radio Access Network (NG-RAN), wherein the NGAP message is to cause the NG-RAN to deliver a paging message including a voice service indication to a user equipment (UE) in a radio resource control (RRC) inactive state.

2. The apparatus of claim 1, wherein the processor circuitry is to:
cause transmission of the NGAP message to the NG-RAN over an N2 interface.

3. The apparatus of claim 1, wherein the processor circuitry is to:
receive an N11 message from a session management function (SMF) over an N11 interface, wherein the N11 message includes a paging policy indicator (PPI); and
use the PPI to derive a paging strategy when the UE is in a connection management idle state.

4. The apparatus of claim 3, wherein the PPI is based on a differentiated service code point (DSCP) value.

5. The apparatus of claim 3, wherein the PPI is used to apply a paging policy for when the UE needs to be paged in the RRC inactive state.

6. The apparatus of claim 1, wherein the NGAP message is a downlink non-access stratum (NAS) message.

7. One or more non-transitory computer readable media (NTCRM) comprising instructions for operating an Access and Mobility Management Function (AMF), wherein execution of the instructions by one or more processors is to cause a computing device to:
generate a next generation application protocol (NGAP) message to include a paging cause indication for voice service, and
cause transmission of the NGAP message to a Next Generation Radio Access Network (NG-RAN), wherein the NGAP message is to cause the NG-RAN to deliver a paging message including a voice service indication to a user equipment (UE) in a radio resource control (RRC) inactive state.

8. The one or more NTCRM of claim 7, wherein execution of the instructions is to cause the computing device to:
cause transmission of the NGAP message to the NG-RAN over an N2 interface.

9. The one or more NTCRM of claim 7, wherein execution of the instructions is to cause the computing device to:
receive an N11 message from a session management function (SMF) over an N11 interface, wherein the N11 message includes a paging policy indicator (PPI); and
use the PPI to derive a paging strategy when the UE is in a connection management idle state.

10. The one or more NTCRM of claim 9, wherein the PPI is based on a differentiated service code point (DSCP) value.

11. The one or more NTCRM of claim 9, wherein the PPI is used to apply a paging policy for when the UE needs to be paged in the RRC inactive state.

12. The one or more NTCRM of claim 7, wherein the NGAP message is a downlink non-access stratum (NAS) message.

13. An apparatus to be employed as a Next Generation Radio Access Network (NG-RAN), the apparatus comprising:
memory circuitry;
processor circuitry connected to the memory circuitry, wherein the processor circuitry is to:
receive, from an Access and Mobility Management Function (AMF), a next generation application protocol (NGAP) message, wherein the NGAP message includes a paging cause indication for voice service, and
generate a Uu paging message to include the paging cause indication for voice service; and
radiofrequency (RF) circuitry connected to the processor circuitry, wherein the RF circuitry is to transmit the Uu paging message to a user equipment (UE) in a radio resource control (RRC) inactive state.

14. The apparatus of claim 13, wherein the processor circuitry is to:
receive the NGAP message from the AMF over an N2 interface.

15. The apparatus of claim 13, wherein the paging cause indication for voice service is derived from a paging policy indicator (PPI) included in an N11 message communicated between a session management function (SMF) and the AMF over an N11 interface.

16. The apparatus of claim 15, wherein the PPI is based on a differentiated service code point (DSCP) value.

17. The apparatus of claim 13, wherein the processor circuitry is to:
obtain a PPI value from a header of received downlink protocol data unit; and
enforce a paging policy corresponding to the obtained PPI value when the UE needs to be paged in the RRC inactive state.

18. The apparatus of claim 17, wherein the processor circuitry is to:
determine to include the paging cause indication for voice service in the Uu paging message based on the obtained PPI value.

19. The apparatus of claim 13, wherein the NGAP message is a downlink non-access stratum (NAS) message.

* * * * *